United States Patent [19]

Osdor

[11] Patent Number: 4,462,389
[45] Date of Patent: Jul. 31, 1984

[54] METHOD OF TRAPPING AND UTILIZING SOLAR HEAT

[76] Inventor: Asriel Osdor, 36 Zirelson St., Tel-Aviv, Israel

[21] Appl. No.: 522,550

[22] Filed: Aug. 11, 1983

Related U.S. Application Data

[63] Continuation of Ser. No. 408,055, Aug. 13, 1982, abandoned, which is a continuation of Ser. No. 106,360, Dec. 21, 1979, abandoned.

[30] Foreign Application Priority Data

May 15, 1979 [IL] Israel ........................................ 57291

[51] Int. Cl.$^3$ .............................................. F245 3/02
[52] U.S. Cl. .................................... 126/415; 126/400; 126/452
[58] Field of Search ............... 126/415, 437, 450, 452, 126/900, 400; 60/641.1, 641.8; 165/1

[56] References Cited

U.S. PATENT DOCUMENTS 4,139,056  2/1979  Schöll .................................. 126/400
4,328,788  5/1982  Wirguin et al. ...................... 126/415
4,355,683 10/1982  Griffiths .............................. 126/415

FOREIGN PATENT DOCUMENTS 2357835  3/1978  France ................................ 126/415

OTHER PUBLICATIONS

"Salt Gradient Solar Pond" by F. Zangrando and H. C. Bryant; Solar Age; Apr. 1978 pp. 21 and 32–36.
Solar Pond Project by H. Tabor and R. Matzj Solar Energy vol. 9, No. 4, 1965 pp. 177–182.

Primary Examiner—Samuel Scott
Attorney, Agent, or Firm—Benjamin J. Barish

[57] ABSTRACT

A horizontal highly concentrated body of an aqueous solution constitute a solar pond in which the liquid body is divided into two horizontal strata (an upper and a lower stratum) of different density and temperature gradients. Between said strata is interposed a flowing middle level layer, said strata and said middle level layer having different functions.

The lower stratum function as a solar heat trap for radiations to penetrate thereinto.

The flowing middle level layer functions as a flowing solar heat trap mainly for heat lost by upward heat transmission from said lower stratum.

The upper stratum functions as a flowing or stagnant insulating liquid cover preventing heat losses to the atmosphere of the sunrays penetrating said lower stratum and said middle level layer.

The difference between the heat of evaporation of the dilute solution at the surface of the liquid body of the known solar pond methods and the heat of evaporation of the concentrated solution at the surface of the liquid body of the new solar pond method, is more than 25% of the total incident insolation, the bulk of this difference is trapped and utilized in the new method to double the heat utilization efficiency compared to the known solar pond methods.

Furthermore a self-lift system is used for recycling the hot bottom strata instead of pumps.

15 Claims, 3 Drawing Figures

METHOD OF TRAPPING AND UTILIZING SOLAR HEAT

This patent application is a continuation of my patent application 06/408,055 of Aug. 13, 1982 (now abandoned), which in turn was a continuation of my patent application 06/106,360 of Dec. 21, 1979 (now abandoned).

BACKGROUND OF THE INVENTION

The present invention relates to a method and a system for increasing the heat collection efficiency of solar ponds and for reducing operating cost.

The known solar pond is essentially a black-bottomed basin, usually 100–200 cm. deep, filled with saline water, in which a density gradient is maintained to prevent convection. Israel Pat. No. 12,561 of May 25, 1959 achieves the purpose of maintaining said required density gradient by addition of solid solute or concentrated solution to the bottom region of the pond and addition of fresh water or dilute solution to the surface region of the pond and draining some liquid from the surface region of the pond.

After 15 years of research and development efforts, one of the inventors, Dr. Harry Tabor has stated that "a collection efficiency of 20% and an operating temperature around 90° C. leading to a turbine efficiency of 10%, i.e. 2% overall efficiency is expected " (see "The National Symposium of Energy" held on Mar. 19–21, 1974, Netania, Israel, page 377—published by "State of Israel, the Ministry of Commerce and Industry, National Resources Research Administration," Jerusalem, September 1974).

The reason of this low collection efficiency (20%) is the requirement in said known method to maintain a dilute solution at the surface of the pond as a main means to achieve and maintain a vertical density gradient. The direct result is that the bulk of the solar radiation penetrating the surface of the pond is lost to the atmosphere by evaporation from said dilute solution, due to its relatively high vapor pressure.

In the following table are given the yearly evaporations at the Dead Sea region for solutions of increasing densities, and the yearly evaporation from the carnallite producing basins, for densities of 1,300 and 1,335:

| Density | Yearly evaporation/m² |
|---|---|
| 1.175 | 1600 kg |
| 1.200 | 1520 kg |
| 1.210 | 1420 kg |
| 1.217 | 1330 kg |
| 1.300 | 600 kg |
| 1.335 | 455 kg |

These data are given on pages 8,9 and 12 of a report by "Dead Sea Committee—1955/1956 sub-Committee on Evaporation" published 1956, Jerusalem.

Now, the daily evaporation from the Dead Sea surface (density=1.175) is 4.4 kg/m² compared to the daily evaporation of 1.65 kg/m² from the adjacent carnellite basins (or ponds) at a density of 1.3.

The corresponding heat of evaporation is 2550 koal/m² and 950 koal/m² respectively.

The difference of 1600 keal is 32% of the total incident radiation of 5000 koal/m² per day, as generally assumed.

According to FIG. 3 in "The Physics of the Solar Pond" by H. Weinberger, page 46 of "Solar Energy" Vol. 8, No.2, 1964, and according to Table I in "Solar Pond Project" by H. Tabor and R. Mats, page 180 of "Solar Energy" Vol.9, No.4, 1965, more than 40% or more than 2000 koal/m² per day of the solar radiation reaches the depth of 50 cm. and penetrates into the liquid body below this depth.

The new solar pond method utilizes a highly concentrated acqueous solution, having a density of 1.3 approximately at the surface, and enables to trap in a new manner and to utilize the heat penetrating the depth of 50 cm. (or even less) of the liquid body. Thus more than 40% of the incident radiation or more than 2000 koal/m² per day are utilized compared to a collection efficiency of less than 1000 koal/m² per day as expected by the inventors of the known solar pond methods.

In U.S. Pat. No. 3,647,638 of Mar. 7, 1972 there is described a "Feed-Liquid-Lift System" and there is discussed the "Clementine" method of lift. Also in U.S. Pat. No. 3,741,878 of June 26, 1973 the principles of the above mentioned U.S. Patent are used and some improvements are added.

Now, the object of these methods of lift is to obviate the need of a pump for each evaporator or at each stage of a multi-stage desalination plant based on the known vapor-reheat flash evaporation process.

Between any two consecutive evaporators or stages, which are hermetically insulated against the atmospheric pressure, there is always a positive pressure difference which assists the flow of the liquid feed from the stage of higher pressure to the stage of lower pressure, through a connecting U-tube, or a "well type manometer" system.

The present invention deals with a different case, where there is only one flushing stage (or series) or evaporation chamber (or series). This flushing stage or evaporation chamber is provided with a downward liquid discharge column having a downward extension submerged in the pond open to atmospheric pressure and with an upward liquid feed column connected to a liquid feed supply container (also) open to the atmosphere, the surface level of said latter container being lower than the surface level of the pond.

SHORT SUMMARY OF THE INVENTION

According to a broad aspect of the present invention, there is provided a method of establishing and operating a solar pond of an aqueous solution having a downwardly-increasing density, concentration and temperature gradient, characterized in:

A. forming the pond with at least three vertically-spaced, horizontal strata, comprising:
  (1) an upper stratum including a lower stagnant layer having a downwardly-increasing density gradient;
  (2) a middle stratum including at least one horizontally-flowing layer; and
  (3) a bottom stratum including at least one horizontally-flowing layer;

B. and extracting heat from the horizontally-flowing layer of the bottom stratum, and from the horizontally-flowing layer of said middle stratum. More particularly, the heat is extracted from the horizontally-flowing layers of the bottom and middle strata by withdrawing solution from each of these layers from end of the pond, circulating withdrawn solutions through heat-exchangers to cool them, and then returning the cooled solutions to the same levels of the respective layer at the other end of the pond, sufficient heat being extracted from the withdrawn solution of the middle stratum to cool it to a predetermined saturation temperature.

Preferably, the bottom stratum is formed with a plurality of thin vertically-spaced, horizontally-flowing layers of downwardly-increasing density, concentration and temperature; and the middle stratum is formed with a plurality of thin, adjacent, superimposed, horizontally-flowing layers of downwardly-increasing density, concentration and temperature. In addition, the bottom stratum may be formed with a stagnant layer between its horizontally-flowing layer and the middle stratum.

According to another feature of the present invention, a downwardly-increasing concentration, density and temperature gradient is established and maintained in the bottom stratum by cooling a first portion of the bottom stratum to below its saturation temperature in a first heat exchanger, thus causing the crystallization of a part of the dissolved solute, the produced crystals settling at the bottom of the pond and being redissolved in a second portion of the bottom stratum after cooling same in a second heat exchanger to above its saturation temperature. The solar heat extracted from the first and second portions of the bottom stratum by the heat exchangers available externally of the pond for heating and power production.

Preferably, the slope characterizing the density gradient set up and maintained in the bottom and middle strata is steeper than the slope characterizing the density gradient set up and maintained in the stagnant layer of the upper stratum.

The invention will be better understood by the illustration afforded by the following example in which an upper stratum of the thickness of 80 cm. had been employed, while the thickness of the flowing bottom stratum was 15 cm. The corresponding volumes per m² are 800 liters and 150 liters respectively.

For a velocity of 0.01 m/sec. the flow rate of the bottom stratum is: 150 1×0.01=1.5 1/sec.m. Now if we take 5 liters (i.e. a layer of 0.5 cm) for said minor portion of the flowing bottom stratum, and drive said 5 liters in a horizontal layer (adjacent and underlying the upper stagnant stratum) 5 cm. thick instead of 0.5 cm. thick, at the same flow rate of 5 1×0.01=0.05 1/sec.m., then the new flow velocity of said 5 liters will be 0.001 m/sec. i.e. an order of magnitude slower than the velocity of the remaining 1.5 1 (the major portion).

The thickness and volume of the new flowing bottom stratum will be respectively:

Thickness=15 cm-0.5 cm+5 cm=19.5 cm.
Volume=150 1-5 1+50 1 =195 liters

But the total flow rate will remain the same:

$$(150\ 1 - 5\ 1) \times 0.01 = 1.45\ \text{l/sec.m.}$$
$$+50\ 1 \times 0.001 = \underline{+0.05\ \text{l/sec.m.}}$$
$$1.5\ \text{l/sec.m.}$$

Various further and more specific objects, features and advantages of the invention will appear from the description given below, taken in connection with the accompanying drawings, illustrating by way of example preferred embodiments of the invention.

FIG. 1a is a Temperature-Enthalpy Diagram of Freon—12(Dichlorodifluoromethane) on which are superimposed:

1. the thermodynamic cycle of heating the liquid, vaporizing, superheating, expanding and liquifying the working fluid (F-12), and
2. the cooling in heat exchanger HE3 of the flowing bottom layer FBm; the additional cooling in heat exchanger HE2 of a portion of said cooled flowing bottom layer, and the cooling in heat exchanger HE1 of the flowing middle layer M.

General Remarks

1. In the examples given with relation to FIG. 1 and FIG. 2 embodiments it is assumed that the yearly mean insolation is 4850 kcal/m² per day. In summer the mean insolation is 6400 kcal/m² day and the heat of evaporation is 1540 kcal/m² day, say 24% of the insolation, for a density of 1.3 of the convective surface layer of the pond. In winter the mean insolation is 3300 kcal/m² day, and it is assumed that the mean evaporation is also 24% of the isolation, say 790 kcal/m² day. These assumptions are based on known data. In the given examples the data for the summer are used.

Now, the Carnot efficiency increases with the bottom brine temperature for a given condenser temperature. But the lower air temperature in winter enables to acheave by the present system a satisfactory over-all efficiency with a lower bottom brine temperature due to a lower condenser temperature.

2. In the examples given with relation to FIG. 1 and FIG. 2 embodiments, the used solute contains only or mainly a salt such as $MgCl_2.6H_2O$.

3. Repeated experiments have shown that there is no incrustation of the crystallized salts on the walls of the heat exchangers tubes.

Figure 1:
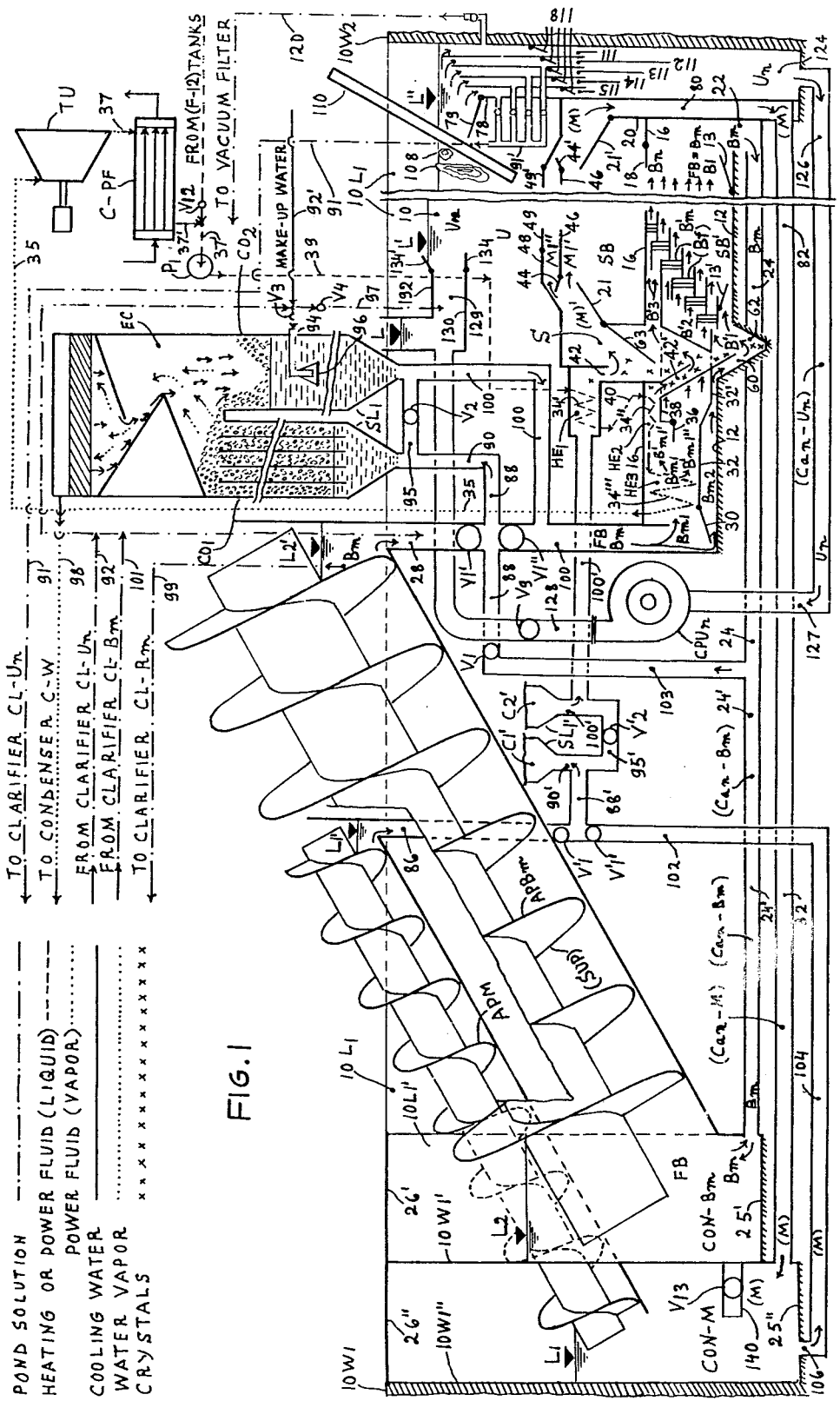
FIG. 1 illustrates diagrammatically a profile view of one form of apparatus constructed in accordance with the invention for trapping solar heat penetrating through the liquid body of the pond and transmitting said trapped heat to a working fluid for power production.
Figure 1A:
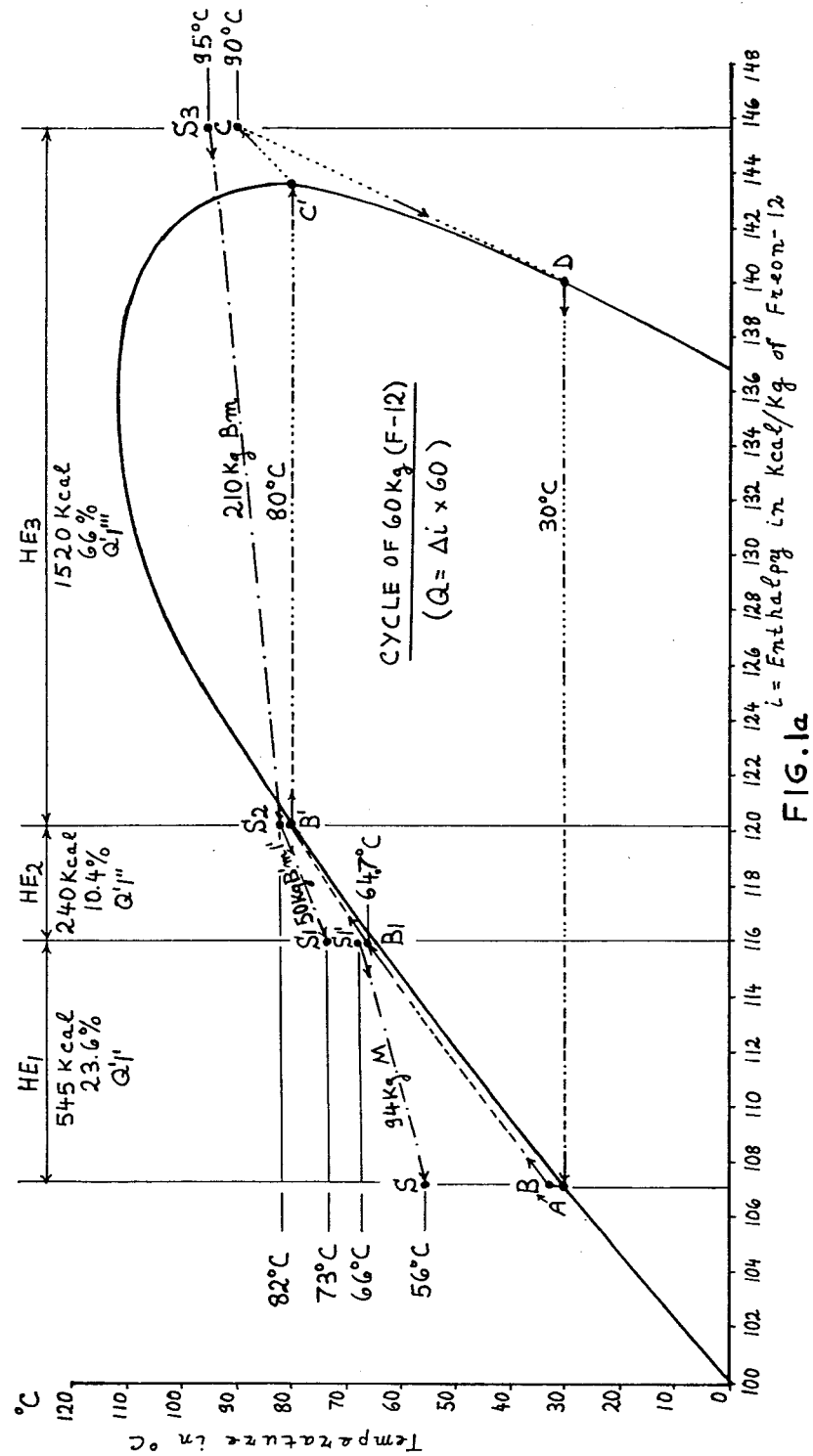

THE TEMPERATURE—ENTHALPY DIAGRAM OF FIG. 1a

The operation of the system may be more clearly understood by giving an illustrative example of the thermodynamic cycle of one kg. of Freon-12 (The Working Fluid) comprising the following steps:

1. compression of the liquid.
2. Heating of the liquid.
3. Heating for vaporization and for superheating.
4. Expansion of the vapor.
5. Cooling for condensation.

Remark: The designations of the various devices used, are included in FIG. 1.

First step: starting at a point A (FIG. 1a), one kg. of liquid F-12 leaving the condenser C-PF has the following conditions: Temperature=30° C.; Pressure=7.581 kg/cm²; Enthalpy=106.07 Kcal/kg. By isentropic compression (by pump $P_1$) from 7.581 to 23.29 kg/cm² the temperature of the liquid rises very little and the enthalpy increases by less than 0.1 Kcal/kg (I will assume that the isentropic work of compression by pump $P_1$ is: $q_1=0.1$ Kcal/kg). At point B the assumed enthalpy is 107.07 Kcal/kg.

Second step: The liquid enters a first heat exchanger $HE_1$ at point B, then enters a second heat exchanger HE2 at point $B_1$ and is heated to point B'. The conditions at point B' are: Pressure=23.29 kg/cm$^2$; Temperature=80° C. which is the temperature of saturation at said pressure; Enthalpy=120.13 Kcal/kg. The heat picked up by the working fluid in said heat exchangers HE1 and HE2 is $Q'_1 = 120.13-107.07=13.06$ Kcal/kg.

Third step: The working fluid enters the third heat exchanger HE3 at point B' and is completely vaporized at point C'. The conditions at point C' are: Pressure=23.29 kg/cm$^2$; Temperature=80° C.; Enthalpy=143.46 Kcal/kg. By further heating to point C, the vapor is superheated: the temperature rises to 90° C. and the enthalpy in increased to 145.5 Kcal/kg. The heat picked up in heat exchanger (HE$_2$) is $Q''_1=145.5-120.13=25.37$ Kcal/kg. The total heat picked up in both heat exchangers is: $Q_1=145.5-107.07=38.43$ Kcal/kg.

Fourth step: The working fluid enters turbine (TU) at point C and leaves the turbine at point D after expansion from 23.29 to 7.581 kg/cm$^2$ The conditions at point D are:

Pressure=7.581 kg/cm$^2$; Temperature=30° C.; Enthalpy=140.08 Kcal/kg. The work of expansion is: $q_2=145.5-140.08=5.42$ Kcal/kg.

Fifth step: The expanded vapor enters the condenser C-PF at point D where it is cooled and liquefied, and leaves the condenser at point A. The heat absorbed in the condenser by said cooling and liquefaction is: $Q_2=140.08-106.97=33.11$ Kcal/Kg.

The energy balance of this cycle of 1 kg. of the working fluid (F-12) is:

energy input=$q_1+Q_1=0.1+38.43=38.53$ Kcal/Kg.
energy output=$q_2+Q_2=5.42+33.11=38.53$ Kcal/Kg.

The available work per cycle of 1 kg F-12 is calculated as follows:

The isentropic work of compression at 85% pump efficiency is $W_1=q_1/0.85$.

The isentropic work of expansion at 85% turbine efficiency is $W_2=q_2\times 0.85$.

The available work is: $W=q_2\times 0.85-q_1/0.85=5.42\times 0.85-0.1/0.85=4.49$ Kcal/kg.

The efficiency is:

$$\frac{\text{available work}}{\text{heat input}} = \frac{4.49}{38.43} = 0.117 \text{ or } 11.7\%$$

Now according to the present invention the trapped and utilized solar heat is 2000 Kcal/m$^2$ per day, or 0.4 of the solar radiation reaching the pond surface, consequently:

The over-all conversion efficiency is:
0.117×0.4=0.047 or 4.7% compared to 0.12×0.20=0.024 or 2.4%
which is the highest over-all efficiency expected according to the known solar pond methods.

The heat output $Q'_1=13.06$ Kcal/Kg (the enthalpy increase from point B to point B') and the heat input $Q''_1=25.37$ Kcal/kg (the enthalpy increase from point B' to point C) are respectively 34% and 66% of the total heat input $Q_1=38.43$ Kcal.

According to the embodiment of FIG. 1 (First Alternative), the utilized heat is 2305 kcal/m$^2$ day in summer.

This means that from said 2305 Kcal/m$^2$ per day 34% or 785 Kcal of the trapped solar heat are utilized in HE$_1$ and HE2 to heat the liquid F-12 from 30° to 80° C. at a pressure of 23.29 kg/cm$^2$ abs. and 66% or 1520 Kcal are utilized in HE 3 to vaporize the liquid at 80° and 23.29 kg/cm$^2$ (from point B" to point C') and then superheat the vapor from 80° to 90° C. at the same pressure (from point C' to point C).

The mass of F-12 heated is 2305/38.43=60 kg.

Now, in accordance with the example given in the FIG. 1 embodiment a mass of 210 kg of the hot solution is cooled from 95° to 82° (from S3 to S2) supplying the required heat for said vaporization and superheating of 60 Kg. F-12 in HE3. A portion (50 kg) of the cooled solution (at point S2) is further cooled in HE2 to 73° C., supplying the required heat to raise the temperature of 60 kg F-12 in the liquid state from 64.7° (point B1) to 80° C.

The saturation temperature at a concentration of 0.398 MgCl$_2$ or 0.8505 MgCl$_2$6H$_2$O of the bottom solution is 80° C., while the concentrations corresponding to the saturation temperature of 73° are 0.39 MgCl$_2$ and 0.833 MgCl$_2$6H$_2$O. Due to said cooling a mass of 5 kg. MgCl$_2$6H$_2$O crystallizes. The thermal advantage due to the endothermic heat of crystallization of these 5 kg. MgCl$_2$6H$_2$O are neglected in the following. Finally a saturated solution of 45 kg. at 73° C. is obtained.

On FIG. 1a are also superimposed the lines connecting the points S3 to S2; S2 to S1, and S1' to S, indicating respectively the heat of cooling (1520 kcal) of said 210 kg in HE3, the heat of cooling (240 kcal) of said 50 kg in HE2 and the heat of cooling (545 kcal) of 94 kg of a middle level layer M in HE1 (see the example in FIG. 1 embodiment). In heat exchanger HE1 said 94 kg are cooled from 66° to 56° C. while 60 kg of liquid F-12 are heated from 30° to 64.7° C.

THE EMBODIMENT OF FIG. 1

First Alternative:

FIG. 1 illustrates diagrammatically a profile view of an apparatus for trapping and utilizing solar energy for power production.

The apparatus shown in FIG. 1 comprises a solar pond 10 in the form of a rectangle with two parallel end walls $10W_1$ (the left end wall) and $10W_2$ (the right end wall) and two parallel lateral walls 10L1 (the front side wall) and $10L_2$ (the rear side wall - not shown in the drawing).

Conventionally the bottom 12 of the pond is blackened. The pond is filled with a liquid body 10 divided vertically into two horizontal strata: an upper stratum U and a bottom stratum B. Between said strata is interposed a flowing middle level layer M.

Figure 2:
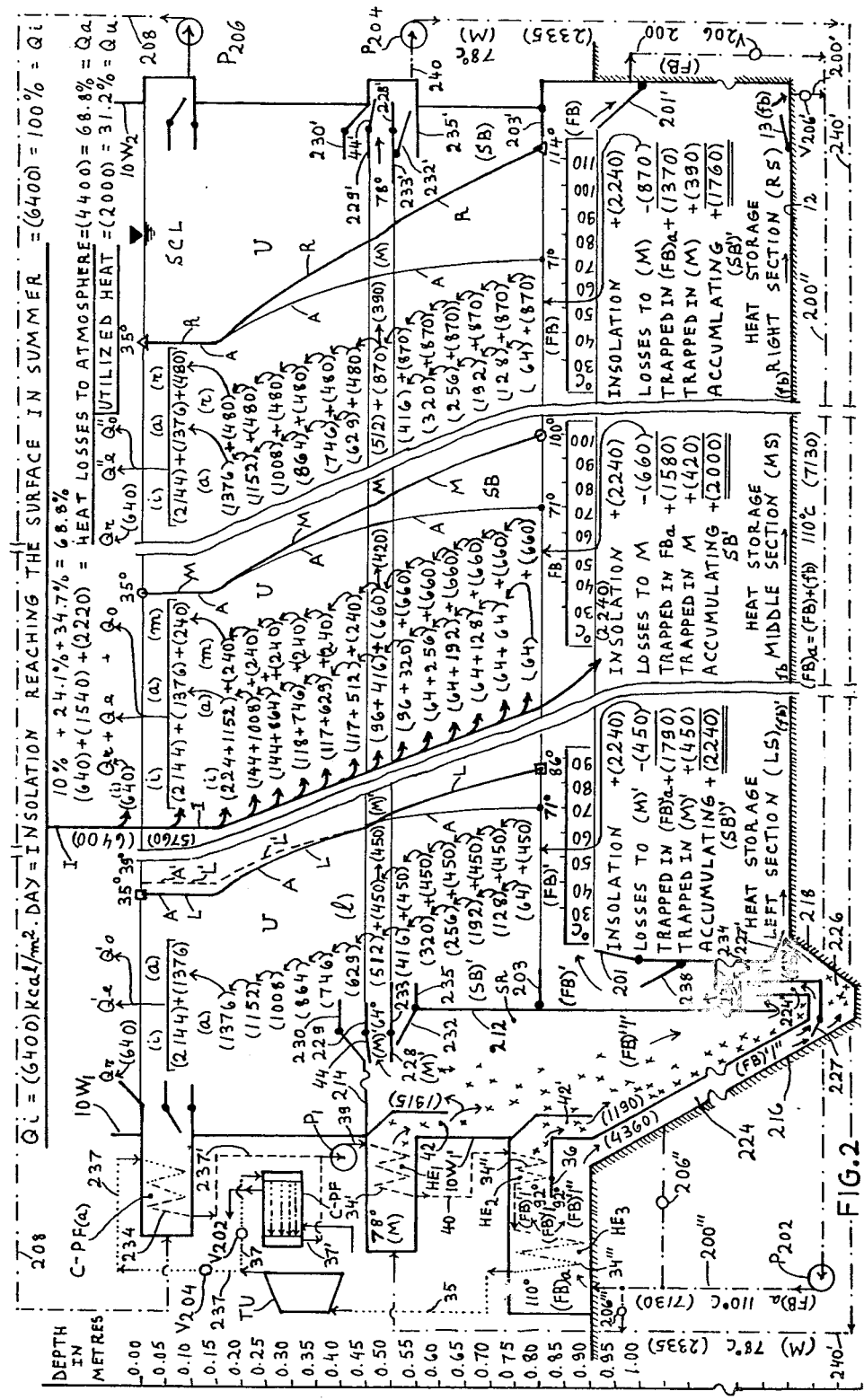
FIG. 2 illustrates diagrammatically a profile view of another form of apparatus similar to that of FIG. 1 in most respects but modified mainly by establishing and maintaining a flowing convective bottom layer FB instead of a series of adjacent parallel flowing sub-layers Bl to Bn of upwardly decreasing concentration, density and temperature.

In the examples used in relation with FIG. 1 and FIG. 2 embodiments, the liquid body is of a highly concentrated magnesium chloride solution having upwardly decreasing concentration, density and temperature gradients from bottom to top.

The upper stratum U is stagnant excepting a relatively thin flowing layer near the surface (a flowing surface layer Un). Stratum U is adjacent and overlying said flowing middle level layer M. The bottom stratum B is composed of a stagnant layer SB adjacent and underlying layer M, and a flowing layer FB or Bm composed of a series of parallel flowing sub-layers B1 to Bn (designated also as layers B'1 to B'3, or B'm or Bm) adjacent and underlying stagnant layer SB, and adjacent and overlying a stagnant layer SB', which is adjacent and overlying the bottom (12) of the pond.

The appropriate temperature, concentration and density of the surface layer Un are respectively: tUn=35° C., cUn=0.326 and dUn=1.3.

The approximate thickness of the upper stratum U is 0.40 meters.

The approximate depth of the upper part of the flowing bottom layer FBm is 0.75 meters, and the solar heat penetrating said upper part is 2305 kcal/m² per day in summer. (Important characteristics of the hot streams are given in table 1a).

Remark: In FIG. 1 the conduits 24, 82 and 126 are also designated by canals (can - Bm), (Can - M) and (Can - Un) respectively (see further "Use of Canals" and "Example of start-up operation of the pond").

In the following description of the embodiment of FIG. 1 there is used an example relating to a 24 hour cycle of a strip of the liquid body of the pond, one meter wide, one meters deep (without SB') and 864 meters long. The length of 864 meters corresponds to a flow velocity of 0.01 m/sec. of the bottom stratum (hereinafter called the bottom solution), during 24 hours i.e. during 86400 seconds. The flow rate of the bottom stream for a thickness of 0.15 meters is 1801×0.01=1.8 l/sec.m.

Now, a volume of 180 l/m² of the bottom stream Bm at 95° C. and a density of 1.39 (i.e. 250 kg/m²) flow from the right end of the bottom stratum, i.e. from the space comprised between the right end of bottom 12 (said right end of bottom 12 including a gate 13 which is placed in a vertical position for the purpose of start-up operation as described later with relation to the embodiments of FIGS. 1 and 2), a horizontal partition 16 positioned at a vertical distance of 0.75 m. from the surface (said partition 16 including a layer thickness regulating gate 18) and a vertical partition, into and through a weir distributor 22, downwardly. Then the bottom solution flows into and through underground inclined parallel conduits 24 via the supply container CON-Bm of pump APBm (Archimedean screw pump), which raises the bottom solution from level L2 to the required level L2' above level L' of the pond surface. It is assumed that the condition L2'-L'=m3 m. is more than required, to overcome the friction losses, mainly in the heat exchangers HE₂ and HE₃, and to enable the flow through passages 24 via supply container con-Bm and the slow flow of the bottom solution etc.

Remarks:

1. Instead of underground conduits it is advantageous to use canals, which are less expensive, easy to clean and maintain, and requiring a smaller inclination or slope for the same flow rate.

2. The Archimedean screw pump APBm is shown without its housing, and the supply container CON-Bm is shown by its left side wall 10W1', by its lateral front wall 10L1', by its bottom 25' and by its cover 26', destined mainly to reduce to a minimum heat losses to the atmosphere from the hot solution Bm. Pump APBm is also designated by (SUP) when used for Start-Up Operation.

3. The Archimedean screw pump APM (see further) is shown also without its housing, and the supply container CON-M is shown by its left side wall 10W1" which is a portion of the wall 10W1 of the pond, by its bottom 25" and its cover 26" destined mainly to reduce to a minimum heat losses from the hot solution M to the atmosphere.

The pumped mass of 250 kg. m² (stream Bm) is directed to a downward passage 28 and then divided by flow regulating gate 30 into two portions: one portion (stream Bm2) of 40 kg/m² flows between the bottom 12 and a horizontal partition 32 distanced vertically by approximately 0.05 m. from the bottom 12. The other portion (stream Bm1) of 210 kg/m² is directed to flow by said flow regulating gate 30 through the heat exchanger HE₃ comprising said horizontal partition 32, an upper horizontal partition 16 distanced vertically by 0.75 m. from the surface and coils or tube bundles 34''' destined for the flow of the power fluid 60 kg. of Freon-12), wherein said fluid is vaporized at 80° C. and then superheated to 90° C. (point C of FIG. 1a). Said other portion (stream Bm1) of 210 kg./m² is cooled from 95° to 82° (exiting as stream B'ml) by transmission of 1520 Kcal to said 60 Kg. of F-12. Then this stream B'ml at 82° C. is further divided by flow regulating gate 36 into two parts: a first part (stream B'ml') of 50 kg/m² flows through heat exchanger HE₂ comprising said horizontal partition 16, a lower horizontal partition 38 distanced vertically from partition 16 to accommodate the coils or tube bundles 34", destined for the flow of the power fluid (60 kg. of Freon-12), wherein said fluid mass in the liquid state and at a pressure of 23.29 kg/cm² is heated from 64.7° to 80° C. (see FIG. 1a). Said 50 kg/m² are cooled from 82° to 73° C. (exiting as stream B"ml') by transmission of 240 Kcal to said 60 kg of F-12.

The thermodynamic cycle of the power fluid (60 kg. of F-12): The superheated working fluid (60 kg. Freon-12) exiting from coils or tubes bundle 34'''at 90° C. and at a pressure of 23.29 kg/cm² (point C of FIG. 1a) is directed through conduit 35 to turbine TU, where it is expanded to a pressure of 7.581 kg/cm² and it is cooled to 30° C. (point D of FIG. 1a), the work of expansion being q₂'=325 Kcal. The expanded vapor is directed through conduit 37 to condenser C-PF where it is condensed e.g. by a cooling media absorbing Q2'=1985 Kcal. The liquid (point A of FIG. 1a) is directed through conduit 37' to pump P₁ and is compressed from 7.581 to 23.29 kg/cm², with only a very slight temperature rise.

The compressed liquid is directed through conduit 39 into coils or tube bundles 34' within HE₁, wherein it is heated to 64.7° C. absorbing Q'1'=545 Kcal from 94 kg. of stream M (see further).

The liquid Freon-12 is then further heated in HE₂ while flowing through coils or tube bundles 34" (coils or bundles 34' and 34" are connected by conduit 40) and heated from 64.7° to 80° C. in the liquid state by absorbing Q'f"=240 Kcal from said 50 kg of stream B'ml'. Then the liquid (F-12) is vaporized at 80° C. and superheated to 90° C., thus returning to the starting point (point C of FIG. 1a) of the thermodynamic cycle of said 60 kg. of Freon-12. The absorbed heat is Q'1'''=1520 kcal for said 210 kg of stream Bmi.

The total heat absorbed by said 60 kg. F-12 in HE₁ HE₂ and HE₃ from said heating stream per m² is: $Q'1'+Q'1''+Q'1'''=545+240+1520=2305$ kcal.

The total heat lost by said 60 kg. F-12 by said expansion in TU and by said condensation in C-PF is: $q_{2'}+Q_{2'}=325+1985=2310$ kcal.

In FIG. 1a the transmitted heat Q'1'; Q'1"; Q'1''' in heat exchangers HE₁; HE₂; HE₃ respectively is equal to the corresponding enthalpy difference Δi multiplied by 60.

Said stream(M) of 94 kg/m² cooled in HE₁ from 66° to 56° C. is directed to flow downwardly through a passage 42 within a large settler S, then upwardly through said large settler.

Due to diffusion and to mixing at the interface between stream M and the underlying stagnant layer SB, the concentration of stream M is slightly increased. The small amount of the added solute to stream M by said mixing crystallizes and settles after cooling in $HE_1$ to the saturation temperature of 56° C. in the given example, corresponding to a salt content of 37.6%.

The crystals settle to the bottom, while the brine flows upwardly in the direction indicated by the arrows, overflows the settlers S series and continues to flow in the horizontal stream (M).

After said cooling in $HE_1$ and settling, there is obtained a saturated solution (stream (M)' at 56° C., at a concentration $cM=0.376$ and a density d $(M)'=1,367$ compared to the density $d(M)=1.363$ at 66° C. (see table 1a). The volume of said 94 kg/m² (70 liters/m²) flowing in a layer M 7 cm. thick, at a velocity of 0.01 cm/sec. and a flow rate of 70 $1\times0.01=0.7$ l/sec. In analogy to an example given earlier the layer (M)' is divided into two portions: a minor portion M1", for instance 5 liters (i.e. a layer of 0.5 cm.) is directed by flow regulating gate 44 to flow into the space comprised between the horizontal partition 46, distanced vertically by approximately 40 cm. from the surface, and an upper horizontal partition 48 distanced vertically by 5 cm. from said partition 38. This means that said minor portion of 5 liters per 1m²(M)' flows in a horizontal stream M1" (adjacent and underlying the upper stagnant liquid) 5 cm. thick. The new flow velocity of said 50 l/m² of layer M1" (the minor portion of 5 liters of the original layer (M)' of 70 l/m²) will be equal to the original flow velocity of (M)' multiplied by the volume of 5 l/m² of said minor portion and divided by the new volume of 50 l/m² of the new layer M1". This flow velocity of layer M1", is 0.001 m/sec. i.e. by an order of magnitude slower than the flow velocity of 0.01 m/sec. of the mayor portion (layer M1'), which is the assumed flow velocity of the bottom stream. The advantages of this flow velocity reduction is explained with reference to the example given earlier.

Gates 49 and 49' enable to regulate the thickness of stream M1". Gates 21 and 21' enable to regulate the thickness of stream M1'.

Approximately 5 kg of $MgCl_2.6H_2O$ will crystallize by cooling said first part (B'ml') of 50 kg in heat exchanger HE2 from 82° to 73° C., because the concentration at 73° C. is 0.39 approximately compared to the concentration of 0.398 chosen in this example for the flowing bottom layer FB, which starts to crystallize at 80° C. Due to the endothermic heat of crystallization of $MgCl_2.6H_2O$ the temperature is further lowered. This advantageous temperature lowering is neglected in the following (See "General Remarks").

The cooled mixture of said 5 kg of crystals and the remaining 45 kg of brine at 73° C. flow downwardly through passage 42' into settlers S series, then the brine flows upwardly in the direction indicated by the arrows forming stream B'3. Said stream or flowing layer B'3 has the characteristics given in table 1a.

The second part (stream B'ml") of 160 kg/m², at 82° C. is directed by flow regulating gate 36 to flow around settlers S series between partitions 38 and 32' forming stream B'2 (see table 1a).

The one portion (stream Bm2 of 40 kg at 95° C.), flows first between the bottom 12 and partitions 32 and 32', then through the passage 60 into pit 62, where it dissolves the settling and sliding crystals from the settler S series (including gate 63).

The obtained solution (stream B'1) of 45 kg flows in the direction of the arrows. (See characteristics of stream B'1 in table 1a).

The three streams B'3, B'2 and B'1 or the bulk of the latter, flow through the baffles (Bf), in such a manner as shown on FIG. 1, that there are formed thin sub-layers (Bl to Bn) flowing at practically the same velocity of say 0.01 m/sec, from the left end to the right end of the pond. Said sub-layers having an upwardly decreasing concentration, density and temperature gradients from the lowest level sub-layer Bl to Bn.

A small fraction of stream B'1 is directed by flow regulating valve 13' to flow near the bottom 12 of the pond, so that there will be maintained in the stagnant bottom layer SB' a higher density than the density of the overlying sub-layer Bl.

Furthermore, an upwardly density gradient could be maintained in this manner (if desired) in said stagnant bottom layer SB'.

Remark: In this manner it is also possible to maintain near the bottom 12 of the pond (if desired) a saturated solution, overlying a layer of the solute crystals covering the entire area of the bottom or portion thereof.

By means of flow regulating gates 21' and 44' the streams M1' and M1" (partly mixed) forming stream (M) are directed to flow downwardly through weir distributor 80, then through the underground inclined parallel passages 82 via the (M) stream supply container CON-M of pump $AP_M$ (Archimedean screw pump), which raises stream (M) from level $L_1$ to the level $L_1$, which is sufficiently high to enable the (M) solution to flow through the downward passage 86, valve $V_1'$, the horizontal passage 88' and the upward passage 90' into and through the $SL_1$, device (partly shown) Remark: conduit 90' is connected to conduit 100' by a pipe 95' including a valve $V_2'$ with the only purpose to show the possibility to by pass the $SL_{1'}$ device in the case that in some specific conditions this $SL_{1'}$ device will not be required. In such a specific case valve $V_2'$ will be open, but generally valve $V_2'$ is closed. Valve $V_1'$ is closed when valve $V_{1'}$ is open. By closing valve V'1, stream (M) flows from container CON-M into $SL_{1'}$ through open valve V'1', conduit 102, conduit 104 and outlet 106. Stream (M) flows through conduit 100' to HE2.

In the embodiment of FIG. 1 there are shown two alternatives of using the $SL_1$ device. In a first alternative the $SL_1$ device is operated in combination with pump APBm functioning for the recycling of layer Bm. In this first alternative the main function of said device is the solution of the problem of the upward diffusion of the solute. In a second alternative the $SL_1$ device performs alone said two functions:

A. The solution of the problem of the upward diffusion of the solute.

B. The recycling of layer Bm.

The following is a detailed description of said $SL_1$ device of FIG. 1, assumed to handle, by way of example one m² of layer Bm per day i.e. 250 kg. per day, at tBm=95° C.; cBm=0.398; dBm=1.39

A. The solution to the problem of the upward diffusion of the solute by the $SL_1$ device:

It is assumed in the following that the solute diffuses upwardly at a rate of 50 gm per m² per day (or 50 tons/km² per day). The diffused solute is returned from the surface to the bottom of the pond in the following manner:

A mass (m)D=0.050 kg/m² of the solute contained in a mass (m)Un of the portion of the highest level layer Un, after being directed by conduit 91 and clarified in clarifiers Cl-Un (not shown in the drawing) is directed through conduit 92, valve $V_3$, inlet conduit 94 and impact plate 96 into column $CO_2$, which is open at its upper end to the evaporation chamber EC, while a downward conduit 100 at its bottom end is submerged in the bottom solution of the pond. The bulk of the clarified portion of the surface layer is returned to the pond by pipe 97 with valve V4, eventually with make-up water for evaporation losses, via pipe 92'.

A clarifier CL-Bm (not shown on the drawing) is used to clarify the bottom solution (practically also layer M) by directing thereto through conduit 99 a portion of stream Bm, and then returning the clarified portion to the bottom of the pond by conduits 101 and passage 28. In this example the density of the surface layer is $dUn = 1.3$ at a temperature of 35° C. approximately; the concentration of the solution is $cUn = 0.326$, and said mass $(m)Un$ of the solution is $0.050/0.326 = 0.1534$ kg/m².

To obtain 0.050 kg. of the solute from 0.1534 kg. of the surface layer Un, a mass of water $(m)W = 0.1534 - 0.050 = 0.1034$ kg/m2 should be evaporated. Said 0.1034 kg/m2 of water are evaporated in said SL1 device from a mass mBm i.e. 250 kg/m2 of layer Bm by directing said mass to flow upwardly from passage 88 through conduit 90 into the bottom end of column CO1 of SL1. The upper end of this column CO1 is also open to the evaporation chamber EC, where the vapor pressure is maintained a little below the vapor pressure of the solution Bm at 95° C. (in this example).

The estimated boiling point rise (BPR) of the solution Bm at 95° C. and a concentration of 0.398 is 27° C. This estimation is based on FIG. 11–19 "Boiling point rise of aqueous solutions" of "Perry's Chemical Engineers' Handbook", Fourth Edition.

B. The self-lift system by the SL1 device.

The SL1 device of the present invention is a self-lift system for recycling hot horizontal layers of a solar pond liquid body at the desired depth, using as only driving force the external work of vaporization of a small fraction of the recycled solar heated solution. The SL1 device is a pumping system without moving parts, wherein there is used a combination of:

1. A first vertical column CO1 (the suction and driving branch) with a downward extension 90, a horizontal conduit 88, an open valve V1 (valve V1" is closed), a downward conduit 103, a horizontal conduit 24 to the right end, or conduit 24' to the hot solution container CON-Bm at the left end of the pond. This container is open to the atmospheric pressure, where the surface level L2 of the liquid therein is lower than the lowest surface level L" of the pond.

2. A second column $CO_2$ (the discharge branch) with a downward extension leading to the hot bottom stratum of the pond at the desired discharge depth.

(3) An evaporation chamber EC placed above said columns and connected to their open top end. In said evaporator chamber is created and maintained a lower vapor pressure than the vapor pressure of the solution within said columns at or near the liquid level therein, said columns being preferably of the same cross-section and approximately of the same height above the liquid surface body of the pond, but they are different from each other by their inside: The second column $CO_2$ practically does not contain any interior parts, while the first column $CO_1$ is provided with a plurality of vertical flat or corrugated sheets horizontally spaced from each other, or with a plurality of vertical tubes open at both ends, so that a plurality of vertical narrow passages is provided within said first column. The pumping i.e. the up-flow of the hot water solution through the first column $CO_1$ into the evaporator chamber and then the down-flow of the water solution (less a minor fraction in the form of evaporated water vapor) through the second column $CO_2$ is effected by creating and maintaining in said evaporator chamber a sufficiently low vapor pressure to cause boiling at the liquid surface in both columns, but it produces and maintains in the first column only boiling mixture columns, flowing upwardly through said narrow passages, which eliminates or reduces the collapse of said boiling mixture columns by downward slip of the liquid and by upward slip of the vapor. Said boiling mixture overflows the top end of said first column $CO_1$ and the liquid droplets are separated from the vapor and collected at the bottom of said evaporator chamber and flow into the open top end of the second column $CO_2$, while a portion of said liquid droplets settles directly into the open top end of $CO_2$. Then said collected and settled droplets cause a downward flow of the liquid column within $CO_2$ to its open bottom discharge end. The height of the open top end of the second column $CO_2$ above the pond liquid surface is a little greater than the head of the solution rising and maintained therein due to the difference between the atmospheric pressure Pa and the pressure Pe created and maintained in said evaporator chamber EC, said pressure Pe is a little lower than the pressure Pa of the solution at or near the surface of the liquid column in $CO_2$. In these conditions the solution will boil at its surface, but the cross section of $CO_2$ will be sufficiently large to cause downward slip of the liquid and upward slip of the vapor, and thus to prevent the formation of a boiling mixture column therein exceeding a practically acceptable height of 20 cm. for instance at the center of the column. Based on the foregoing (data and calculations) it is found that approximately 600 liters is the volume of the mass $(m)W = 0.1034$ kg. of water vapor originating from the mass mBm = 250 kg (a volume of 180 liters) corresponding to the mass $(m)D = 0.050$ kg. of the solute diffusing upwardly per m² of the pond per day. Detailed calculation of the self-lift system are given later.

The surface layer of stream Un reaching the right hand end of the pond carries floating large size bodies such as dead birds and other organic matter, and suspended solids which are non-settlable due to their small size and/or to the high density (1.3) of said surface layer. The large size floating substances 108, when nearing the right end wall 10W2, are stopped by means of a vertical or inclined screen, preferably a bar screen such as is used in the removal of coarse organic solids from waste effluents. Said bar screen is constructed of parallel steel rails about 1 cm. or more apart. The screen is installed at an angle of 30° to 45° to the horizontal and sloped away from the flow. Cleaning of the screen is usually accomplished with a series of moving combs which deposit the screenings in a receptacle located at the top of the unit. In FIG. 1 and FIG. 2 said screening unit is not shown, but the location of the screen is indicated in FIG. 1 by the inclined rectangle 110. The screen unit 110 is located parallel to the right end wall 10W2 over the whole width of the pond, while the combs unit and the screening receptacle (not shown) are moving back and forth alongside the screen, so that the cleaning of the screen is a batch operation. In this manner the bulk of the flowing layer Un passes smoothly through said bar screen, so that the small size floating particles and the suspended particles could be removed better and easier by dividing layer Un into horizontal thinner sub-layers and directing each sub-layer or a portion thereof to the appropriate clarifying device (clarifiers CL-Un) as indicated but not shown on the drawing.

The layer Un after passing said bar screen is directed to the weir distributor 124 (shown by "all 10W2 and wall 78 with flow regulating gate 79 and bottom 125) which includes at its upper part the vertical passages 111; 112; 113; 114; 115, thus dividing layer Un into said sub-layers. Each one of said vertical passages includes a flow regulating gate 118. From each one of the passages 112; 113; 114; 115 all or a portion of the sub-layer flowing therein is directed by a horizontal conduit connected at its right end to the corresponding vertical passage and at its left end to manifolds 91', collecting and directing all or a portion of the sub-layer of said passages (one at a time), via conduit 91 to clarifier Cl-Un.

Each one of the said horizontal conduits is provided with a flow regulating valve (both, conduit and valve are shown but are not marked by numbers). During a 24 hour cycle, portions of each one of said sub-layers could be clarified, by means of known clarifiers, or one sub-layer could be clarified per day. The sub-layer which contains the floating small size particles and directed to the vertical passage 111 is preferably clarified by a vacuum filter VF (not shown on the drawing). The flow regulating gate 118 of passage 111 is used to make sure that practically all the floating particles flowing into passage 111 will flow with a minimum of liquid and will be supplied via conduit 120 to the vacuum filter VF. The bulk of stream Un remaining after said portions thereof have been directed to be clarified, flows downwardly through the lower part of the weir distributor 124, then through inclined parallel conduits 126, suction branch 127, centrifugal pump CPUn, discharge branch 128 with open valve V9 via horizontal distributing path 129, formed by the power and upper parallel horizontal partitions 130 and 132 with layer thickness regulating gates 134 and 134' respectively. A small level difference between L' and L" is sufficient to produce a smooth flow of layer Un at the assumed very slow flow velocity of 0.01 m/sec.

The following is a NOMENCLATURE relating to Table 1a and Table 1b of the embodiment of FIG. 1.

| | |
|---|---|
| St-(B) | Stratum or stream before heat exchange. |
| U | Upper stratum. |
| (M) | Middle level stream. |
| B | Bottom stratum. |
| Bm | Mixture of bottom sub-streams (B1 to Bn). |
| St-(A) | Stratum or stream after heat exchange, crystallization and redissolving of the crystallized solute. |
| (M) | Middle level stream. |
| B'3 | Upper sub-stream of the bottom stratum. |
| B'2 | Middle sub-stream of the bottom stratum. |
| B'1 | Lower sub-stream of the bottom stratum. |
| B'm | Mixture of the bottom sub-streams (B'1 to B'3) |
| m | Mass of the solution streams in kgs/m$^2$ per day. |
| d | Density of the solution in kgs/liter. |
| c | Concentration of the solution in kgs. of the solute per one kg. of the solution. |
| t | Temperature in °C. |
| (m)D | Mass of the upwardly diffused solute in kgs/m$^2$ per day, and returned to B. |
| Hc | Heat content in Kcal. per mass m. |

TABLE 1a

Characteristics of The Hot Streams

| | m | d | c | t | Hc |
|---|---|---|---|---|---|
| St-(B) | | | | | |
| (M) | 94 | 1.363 | 0.376 | 66 | 3545 |
| (m)D | (0.05) | | | | |
| Bm | 250 | 1.39 | 0.398 | 95 | 13200 |
| Total | 344 | | | | 16745 |
| St-(A) | | | | | |
| (M)' | 94 | 1.367 | 0.376 | 56 | 3000 |
| B'3 | 45 | 1.388 | 0.39 | 73 | 1830 |
| B'2 | 160 | 1.398 | 1.398 | 82 | 7290 |
| B'1 | 45 | 1.407 | 0.406 | 94 | 2320 |
| B'm | 250 | 1.398 | 0.398 | 82.5 | 11440 |
| Total | 344 | | | | 14440 |

TABLE 1b

Energy Balance

| Term | Energy in Kcal/m$^2$ per day |
|---|---|
| Solar heat reaching Bm at a depth of 0.75 meters | (+) 2305 |
| Heat loss upwardly from Bm | (−) 545 |
| Heat trapped in Bm (on FB) | (+) 1760 |
| Heat trapped in M | (+) 545 |
| Available heat for utilization | (+) 2305 |
| Heat utilized in HE3 | (−) 1520 |
| Heat Utilized in HE2 | (−) 240 |
| Heat utilization in HE1 | (−) 545 |
| | 0.000 |

Second Alternative

According to a second alternative of the embodiment of FIG. 1, the stagnant layer SB is eliminated and the mean concentration of the flowing bottom layer FB (or Bm) is reduced from CBm=0.398, corresponding to a saturation temperature of 80° C. (in the given example) to say CBm=0.388, corresponding to a saturation temperature of 70° C.

The main results of these changes are:

1. The solar heat penetrating the upper face of the flowing bottom layer Bm i.e. the depth of 0.45 meters is 2750 Kcal/m$^2$ day, compared to 2305 Kcal/m$^2$ day penetrating the upper surface of the flowing bottom layer Bm at a depth of 0.75 meters according to the example in the first alternative of the embodiment of FIG. 1.

The result of said changes is an increase in the heat collection efficiency from 36% (in the first alternative) to 43% (in the second alternative).

2. The mean temperature of the flowing bottom layer Bm before heat exchange in HE3 is lowered from 95° C. (in the first alternative) to say 80° C. (in the second alternative).

The result of this temperature lowering is that the conversion efficiency of heat to power is lowered from 11.7% (in the first alternative) to 10.3% (in the second alternative).

This means that the overall efficiency is:
0.43×10.3=0.044 or 4.4%
in the second alternative, compared to 0.36×11.7=0.042 or 4.2%
in the first alternative.

Now, an increase of the temperature and/or of the concentration of layer Bm of the second alternative, will result in an increase of the conversion efficiency above 10.3%, and in an increase of the overall efficiency above 4.4%.

Use of Canals

Instead of three series of underground parallel conduits for the flow of the streams Un; M and Bm from the right end of the pond to the left end, there are used three single or double canals, (Can-Un), (Can-M) and (Can-Bm) for stream Un, for stream M and for stream Bm, respectively.

The advantages of using canals will be better understood by the illustration afforded by the following example in which a rectangular pond of a width of 1160 meters and a length of 864 meters had been employed. The thickness of the stream Bm is approximately 0.2 meters and the cross-section of its flow in the pond is approximately 250 m². Now for a slope of 0.3 meters per km. length of a canal of one of the usual types, the flow velocity is approximately 0.5 meters per second i.e. 50 times greater than the assumed flow velocity of 0.01 m/sec. of layers Bm and M of the pond. Consequently the cross-section of the flowing liquid body in the canal (Can-Bm) for stream Bm will be 250 m²/50=5 m² approximately. For a depth of 0.5 m, the width of the flowing liquid in said canal is approximately 10 meters i.e. less than 1% of the width of the pond.

Remarks: In the above example the volume of the flowing liquid in the canal (Can-Bm) is 864 meters×10 meters×0.5 meters=4320 m³. This volume is sufficiently large, so that the canal (Can-Bm) may also serve as the supply container (CON-Bm) for recycling stream Bm by the (SL1) device. Also canal (Can-M) serves as a supply container (CON-M) for recycling stream M by pump APM and or by the self-lift device SL1'.

The Self-lift system calculatons

The self-lift system by the (SL1) device of the embodiment of FIG. 1 is used for returning the upwardly diffused solute and for the recycling of stream Bm i.e. 250 kg/m² at 95° C.

Based on FIG. 11–19 of the above reference, the boiling point rise (BPR) of the solution Bm at 95° C. and a concentration of 0.398 is estimated to be 27° C.

Assuming that 0.2 kgs. of water wll be evaporated per 250 kg/m² of the solution Bm instead of 0.1034 kg. required for recovering 0.05 kg/m² of diffused solute. The temperature drop $\Delta t$ of said 250 kg. of Bm is obtained in accordance with the following equation:

$$\Delta t = \frac{mW \times r \text{ Kcal/kg}}{mBm \times CpBm} =$$

$$\frac{0.2 \times 559 \text{ Kcal/kg}}{250 \times 0.56 \text{ Kcal/kg}} = 0.8° \text{ C. approximately}$$

The saturation temperature of the water vapor in column CO1 is: tsCO1=t Bm .BPR−$\Delta t$=95°-27°−0.°=67.2° C. The vapor pressure corresponding to tsCO1 is PsCO1=0.283 kg/cm² or 2.83 meters of water.

The water vapor produced in CO1 in CO2 and in the evaporation chamber EC is directed by conduit 98 to a water condenser or to a heater (both ar not shown on the drawing), where it is condensed at say t's=67° C., corresponding to the saturation pressure P's=0.28 kg/cm² or 2.8 meters water.

The temperature of the solution downflowing into CO2 is:

t Bm−$\Delta t$=95−0.8=94.2° C.

The mass of the evaporated solution is:

m'Bm=m BM−m(W)=250−0.2=249.8 kg/m²

This mass m'Bm of the solution at t'Bm=94.2° C. is further cooled in CO2 by mixing with the mass m'Un=0.1534 kg/m² of layer Un at any 35° C. to return to the bottom stratum the upwardly diffused solute mD=0.050 kg/m² per day (see the foregoing data and calculations). The mixed mass of 0.1534 kg. of layer Un contains 0.1034 kg of water which is returned to the bottom stratum, so that from the 0.2 kg/m² of the evaporated water in the (SL1) device, a mass of 0.2−0.1034=0.0966 kg/m² of pure water should be returned to the bottom stratum from an outside source. This mass of 0.0966 kg. of make up water per m² per day at 25° C. is directed through conduit 92' and valve V3 via inlet conduit 94 and impact plate 96 into column CO2.

The final temperature and the mass of the solution flowing out from CO2 through conduit 100 into the bottom stratum are respectively: t"Bm=94° C. and m"Bm=250+0.65+250.05 kg/m², which is equal to the mass of one m² of stream Bm+ the mass 0.05 kg of the assumed upwardly diffused solute per m² per day.

Calculation of the self-lift by the SL1 device of FIG. 1: It is assumed that 80% or 0.16 kg. of said 0.2 kg. water are evaporated within column CO1 at a mean temperature tm=94.5° C. of the boiling solution and at a vapor pressure PsCO1=2.83 m. of water corresponding to the saturation temperature tsCO1=67.2° C. in column CO1 and in the evaporation chamber EC.

The volume of the boiling mixture in CO1 is composed of 980 liters of water vapor per 0.16 kg. of evaporated water and of 180 liters of the solution per 250 kgs. of the Bm solution, totalling 1160 liters. The density of the boiling mixture in CO1 is:

d(b)=250/1160=0.215, compared to the density dBm=1.39 of the solution Bm.

In the condition of equilibrium, the head h(w) in meters of water of the fluids in the two column CO1 and CO2, which is due to the difference between the atmospheric pressure ha=10.333 meters of water and the vapor pressure PsCO1=2.83 m. of water within CO1 and within evaporator chamber EC is h(w)=10.333−2.83=7.503 meters of water.

For the density of the solution dBm=1.39, the head of the solution in column CO2 is:

h2'=7.503/1.39=5.4 meters.

The total height H of column CO2 above the surface of the pond (i.e. above the level L') provides also for:

1. An additional head h2" of the solution above h2'. This additional head is the driving force required to overcome all the head losses of the downward flow of the solution through column CO2 and the extension 100, of the flow through the heat exchangers HE3 and HE2 and through all the passages, flow regulating gates and baffles, until the stream reaches the right end wall 10W2.

2. An additional space of a height h2"' of less than 0.5 m. above h2", required for the alternate formation and collapse of the boiling mixture below the top of column CO2 (see above).

Consequently the total height of column CO2 (above level L') is: H=h2'+h2"+h2''', where h2'=5.4 m. and h2'''<0.5 m. If we take H=9 meters, then the height of h2" is 9−5.4−0.5=3.1 meters of the solution Bm.

It is assumed that this height of 3.1 meters is more than sufficient for said requirement to overcome said head losses, i.e., in the conditions of the very slow flow characterizing this system.

Remark: In the hypothetical case that a greater height than 3.1 meters is required for h2", appropriate adaptation of above calculation should be resorted to.

For the height H=9 meters of the columns CO1 and CO2 above said level L', the height H1 of column CO1 including extension 90, above the level L2 of the surface of container (CON-Bm) is greater than H by the difference between the level L' of the surface of the pond and the level L2 of the surface of said container, connected to the extension 90 of column CO1.

In the above example relating to the canal (Cam-Bm) the slope is 0.3 meters, so that said difference is approximately 0.3 meters (say 0.4 m) and H1=9+0.4=9.4 meters.

In the condition of equilibrium for the height H1=9.4 m. of the fluids in column CO1 and in the portion of the extension 90 above the surface of said container (CON-Bm) the head h1' of the solution and the head h1" of the boiling mixture are obtained according to the following equations:

(1) h1'+h1"=H1=9.4 meters
(2) h1'xd Bm+H1"xd(b)=h(w)=7.503 meters, or
    h1'x1.39+h1"x0.215=7.503 meters.

The obtained heads are:
h1'=4.67 meters; h1"=4.73 meters.

This means that a continuous upflow of the fluid from the container (CON-Bm) through the extension 90 and the column CO1 will be produced and the boiling mixture will overflow the top of column CO1, in the case that the height of the upper portion of column CO1, which is provided with a plurality of said vertical narrow passages, will be greater than h1". This result is achieved because by increasng the height of said narrow passages, the height of the boiling mixture is increased. In this case the new head h'1" of the boiling mixture will be greater than h1" and the new head h'1' of the solution will be smaller than h1'.

In this manner one of the two essential conditions required for the self-lift of the solution Bm from the container (CON-Bm) into the space of the evaporator chamber EC is fulfilled.

This condition is defined by the following inequality: h'1'xd Bm+h'1"xd(b)<h(w)=7.503.

Example: If h'1"=7 meters instead of 4.73 meters then h'1'=9.4−7=2.4 meters instead of 4.67 meters and the inequality is:
2.4×1.39+7×0.215=4.841<h(w)=7.503.

The second essential condition is the supply of the required driving force for the self-lift:

The latent heat of vaporization of said 0.16 kgs. water within column CO1 at 67.2° C. is 0.16×559 Kcal/kg=89.4 Kcal.

But as the mean brine temperature is 94.5° C. the vapor is superheated to 94.5° C. and its volume is 6100 liters/kg. The heat equivalent of the external work of vaporization is 0.16×40=6.4 Kcal. i.e., that the available work is 2730 kg.meters per 0.16 of evaporated water.

In the hypothetical case that the solution Bm does not vaporize and there is not formed a boiling mixture in column CO1, then said pressure difference h(w)=7.503 meters of water will cause the solution to rise into CO1 from the container (CON-Bm) to a height of 5.4 meters above the level L2. This means that the work required to drive the solution to the additional height of 9.4−5.4=4 meters up to the open top of column CO1 is 4×250=1000 kg. meters. This required work is 36% approximately of said available work of 2730 kg-meters.

Remark:

The described self-lift system is similar in many respects to the known airlift system, where compressed air is introduced into the liquid, producing a mixture of air and liquid which being of smaller weight than the liquid itself, rises in the well casing. Now, as the efficiency of the airlift system is about 70% (see page 6–13 of "Perry's Engineers'Handbook", fourth edition), it is expected that much more than 50% of the external work of evaporation could be utilized by the self-lift system according to the present invention.

Start-up operation of the power fluid cycle:

The power fluid (F-12) in the liquid state is pumped by pump P1 from F-12 tank (not shown) through suction branch 37' and open valve V12 (shown on FIG. 1) compressed and than driven through discharge branch 39, into and through coils or bundles 34', 34", 34''', within HE1, HE2, HE3 respectively, where the power fluid is heated and follows the cycle described in the foregoing.

Examples of the utilization of a 100 km² solar pound

1. Power production of 1000 MV.

A conventional power plant of 1000 MW operating 300 days per year, produces 24×10⁶ KWh per day or 7.2×10⁹ KWh per year. At an efficiency of 40%, 1.55 million tons of liquid fuel per year approximately are used, i.e. 1.55×10¹³ Kcal.

Now, from 2000 Kcal of solar heat trapped per m² of the pond per day, 10% approximately or 200 Kcal are converted into utilisable power i.e. that from 1 m² approximately 0.232 KWh are produced. To produce said 24 ×10⁶ KWh per day a pond (or a series of ponds) of a surface of 100×10⁶m² or 100 km² approximately is required. The heat used is 300 days×2000 Kcal×100×10⁶m²=6×10¹³ Kcal per year. The theoretical yearly heat that could be trapped is 365×2000×100×10⁶=7.3×10¹³Kcal.

2. Production of 500 MGD desalined water.

A mean performance ratio (PR) of more than 7.5 lbs/1000 Btu or 13.5 kg/1000 Kcal is expected from two (DP)1 and (DP)2 (not shown) desalination plants. At this PR there are required 74000 Kcal per 1 m³ of product water. It is assumed that 70% of the trapped solar heat (i.e. 1400 Kcal/m² per day) are utilized for heating in (DP)1 and (DP)2. This means that said 74000 Kcal could be supplied by 53 m² approximately of the pond. The remaining 30% (i.e. 600 Kcal/m² per day) of the trapped heat by said 53 m² of the pond (i.e. 31800 Kcal/53 m² per day) are available to be utilized for power production in the desalination plants and for the operation of the ponds.

The (SL1) device requires approximately 100 Kcal per m² or 5300 Kcal per said 53 m². The electricity requirements in (DP)1 and (DP)2 operating at a top temperature t'(M) and t'Bm respectively, is less than 5 KWh/1000 gallons of product water (i.e. less than 1.32 KWh per 1 m³). By adding the electricity requirements to drive APUn and all other electricity requirements of the pond system, the total electricity required is less than 1.5 KWh per 1 m³ of product water (i.e. 5.7 KWh/1000 gallons).

At 10% conversion efficiency, the heat required to produce said 1.5 KWh is 12900 Kcal, so that an excess of heat of 31800−5300−12900=13600 Kcal is available for possible heat or power requirements and/or for power production.

Said required 1.5 KWh of electricity per 1 m³ of product water will be supplied by a power plant of 125 MW using 12.5% of the heat trapped by said 100 km² ponds, while the available heat to be utilized is 30% of the trapped heat.

The production of 500 MGD (i.e. 2 millions m³) of product water by 100 km² solar ponds, means that 5 gallons of desalined water are produced daily per 1m² of the pond, according to the present invention. It also means that a 100 km² solar pond could produce 600 millions m³ desalined water per year.

Remark: A large surface solar pond system is made of a series of ponds having a length of say 1 km. in the direction of the flow of the bottom stratum. It is expected that each one of the ponds could be effectively utilized during 300 days per year. But said effective utilization time of the series of the ponds could be arranged in such a manner that a continual heat utilization and/or power production during the whole year, is achieved.

There will be of course a difference in the energy output between the summer and winter months, but the heat storage provided by the ground is expected to have an appreciable equalizing effect on said output difference.

Example of start-up operation of the pond:

Remarks:

1. The filling of the pond with an aqueous solution of magnesium chloride could be effected in any one of the known ways suggested with relation to the known ponds where a density gradient from 1.3 (before heating) at the bottom to 1.0 at the surface is obtained. Uhe filling is realized according to one of said suggestions by layers of 10 cm. each: starting at the bottom with the highest density layer of 1.3 and than adding one above the other layers of gradualy decreasing density.

2. According to the example given in relation to the embodiment of FIG. 1 of the present invention the mean density of the bottom stream before heat exchange is 1.39 approximately at 95° C. and the mean concentration is 39.9% corresponding to a saturation temperature of 80° C. approximately. The mean density of the surface layer is 1.3° at 35° C. and the mean concentration is 32.8%. This surface solution is far from being saturated; the saturation temperature at 30° C. corresponds to a concentration of 35.9% and a density of 1.344.

3. The mass and the mean concentration of the upper stratum are 500 kg./m² and 34% of $MgCl_2$ respectively (see the foregoing). The mass/m² of the liquid body of a total thickness of one meter (i.e. the mass of 1000 liters) and the mean concentration of the liquid body of the pond according to the example given with relation to FIG. 1 embodiment are: $mv+m(M+Bm+SB)=500=855=1355$ kg and $c(m)=(500\times 34+855\times 39)/1355=37.2\%$ $MgCl_2$ respectively.

The saturation temperature at said mean concentration of the liquid body is 50° C. and the corresponding density is 1.362 approximately. By cooling said mass of 1355 kg. from 50° to 30° C. there is obtained a mixture of 162 kg. $MgCl_2.6H_2O$ crystals containing 76 kg. $MgCl_2$ and 1193 kg. of a saturated solution at 30° C. and at a density of 1.344, containing 42.8 kg $MgCl_2$. The thickness of the crystals layer if spread evenly on the bottom of the pond is less than 0.15 meters.

The actual filling of the pond could be realized by the following steps:

First step: said mixture at 30° C. is fed into the pond, while gate 13 is turned upwardly to a vertical position, for the purpose of preventing the crystals from flowing into and filling the weir 22 and the canal (Can-Bm). The filling of the pond is effected at day time during the summer months, in such a manner that the crystals are being distributed and dispersed at a large portion of the bottom of the pond. The filling operation continues during said first step until the level of the solution in the pond and in the canal (Can-Bm), reaches the height of say 0.35 meters above the bottom 12 of the pond.

Second step: During this step gate 21' is turned upwardly to a vertical position, and start-up pump (SUP) starts to pump the solution (during sunshine hours) from the left side end of canal (Can-Bm) or from container (Con-Bm), and drives the solution through discharge branch 28 and open valves V1' and V1" into and through the space between the bottom 12 and the horizontal partition 32. To achieve this purpose gate 30 is turned upwardly to close the passage and prevent the flow through the heat exchangers HE2 and HE3 and through settler S. Also valves V1 and V2 are closed to close the respective passages and prevent any flow therethrough. The solution is thus made to flow over the bottom 12 from the left side to the right side of the pond and is heated during the sunshine hours of this operation, to above its saturation temperature of 30° C. During said flow the heated solution dissolves said $MgCl_2.6H_2O$ crystals dispersed on the bottom of the pond with further temperature raise, due to the positive (exothermic) heat of solution of these crystals. The maximum thickness of the flowing solution above the bottom of the pond is limited to 0.20 meters by regulating the output of pump (SUP) and by regulating gates 13 and 18.

The stagnant layer of 0.20 meters overlaying said flowing solution, forming the "first" surface layer, serves as heat insulating layer against excessive heat losses to the atmosphere from the higher temperature, more concentrated flowing bottom layer.

Assuming that the filling is effected during not rainy summer days, the temperature of said saturated stagnant solution at 30° C. will rise, and this solution will be further evaporated, resulting in a concentration and density increase. Additional concentration and density increase of said stagnant layer will result from upward diffusion and mainly from mixing at the interface between the two adjacent layers.

In these conditions an addition (the first addition) of said mixture will result in an upflow of the introduced solution. This lighter solution will be spread over the said "first" surface layer, and said first addition will continue until a height of 0.45 m. is reached, thus forming a new "second" surface layer which is 0.10 m. thick. After five to six addition of said mixture the height of the liquid in the pond will be a little less than the desired final height of say one meters. During the fifth addition, gate 79 (see FIG. 1) is turned upwardly to a vertical position to prevent the upflowing solution from flowing into weir distributor 124 and canal (Can-Un). When the desired height is reached, gate 79 is gradually turned downwardly, and the surface solution starts to rise in canal (Can-Un), and pump (CPUn) is started. At this moment pure water is added to the solution for the purpose of lowering the density of the surface layer to say 1.3.

Remark: In the case that after a prolonged interruption of the operation of the pond or for any other reason, the required density gradient is excessively disturbed, it is possible to re-establish the required upwardly decreasing desnity gradient in the following manner:

From the level of the liquid body, where the concentration is equal to said mean concentration of the pond solution, a layer at said level is drawn of and is cooled to say 30° C. The produced mixture of $MgCl_2.6H_2O$ crystals and a saturated solution at 30° C. is returned to the pond, and the operation is continued in a manner which is a combination between said first and second step. In this case the rising saturated solution of say 30° C. forms a layer at the level corresponding to its density (i.e. d=1.344). In addition to said operation the re-establishement of the required density gradient is realized also by the combined effects of the gradual increase of the concentration and of the mass of the bottom solution due to the $MgCl_2.6H_2O$ crystals addition and dissolution, of the surface evaporation, of the upward diffusion of the solute and of the mixing at the interface between the stagnant and flowing layers.

Third step: After said two steps, the gates 13; 30; 74 and 79 are returned to their original position as shown in FIG. 1. The start-up operation is stopped and the normal operation of the pond as described in the foregoing is started.

The start up operation of the pond according to the embodiment of FIG. 2 could be realized in a manner very similar to the manner described above for the embodiment of FIG. 1.

Example of using inexpensive or even cumbrous highly concentrated residual brine of the potash industry, containing mainly $MgCl_2$, for filling the solar ponds of the present invention.

The following example relates to the residual liquor of the carnallite solar basins (crystallizer) near the Dead Sea (called "the carnallite basins").

It has been found that $MgCl_2.6H_2O$ starts to crystallize at a temperature of 40° C. and at a density of 1.37 by evaporation of the residual liquor of the carnallite basins.

The salt contents of said evaporated residual liquor is 37.5% approximately, composed of 28.7% $MgCl_2$; 8.3% $CaCl_2$ approximately and less than 0.5% ($KCl+NaCl$).

Now, the density of a saturated aqueous solution of pure $MgCl_2$ at 40° C. is 1.351 and its concentration is 36.5%. Consequently, if instead of an aqueous solution of $MgCl_2$, a solution of the above composition is used for filling the pond, then the mass of the solution per $m^2$ and a height of 0.65 m. will be a little greater than the mass of 8.75 kg/$m^2$ of a pure $MgCl_2$ aqueous solution, used in the foregoing example for filling the pond.

The presence of said relatively great quantity of dissolved $CaCl_2$ and the very small quantity of dissolved $KCl+NaCl$, will have no disadvantageous effect on the process. The mass of each one of streams M and FB or Bm will be slightly increased, but the energy balance will be maintained, and the difference of 45 kcal/$m^2$ per day between the heat content of (M) and (M)' will remain unchanged. Also $MgCl_2.6H_2O$ only will crystallize by cooling in heat exchangers HE1 and HE2.

The density of a representative residual liquor from the carnallite basins is 1.332 at 20° C., and its composition is:

$MgCl_2$; $CaCl_2$; $NaCl$; $KCl$; $H_2O$ 26.14%; 7.25%; 0.47%; 0.38%; 65.76%.

This liquor could be evaporated further in the carnallite basins up to a density of say 1.37 at 40° C., so that more carnallite will be crystallized, or the residual liquor could be transferred to an additional carnallite basin, wherein it will be further evaporated during the hottest summer months, resulting in further crystallization of carnallite, in an increase of the density and the concentration and in a temperature rise during day time. The so obtained hot liquor could be used for filling the pond in the above described manner.

The cooling of said hot liquor for the production of a mixture of $MgCl_2.6H_2O$ crystals and a saturated solution at say 30° C., could be effected by heat exchange in any known manner, but it is advantageous to use as cooling media, the Dead Sea water pumped into the solar salt evaporators. Said pumped Dead Sea water could for instance be directed to pass through the coils or the tube bundles placed within an open heat exchanger in the form of a canal, which is provided with means for extracting the mixture of said cooled saturated solution and the $MgCl_2.6H_2O$ crystals produced by said cooling.

In this manner the same pumps are doing a double job, while only a relatively small additional power is required.

The embodiment of FIG. 2

The FIG. 2 embodiment is similar to that of FIG. 1 (First Alternative) in most respects, except that:

1. The flowing bottom layer is a convective layer designated by FB or by (FB)' after heat exchange, or by (FB) before heat exchange, instead of layer FBm or Bm of the embodiment of FIG. 1, which is composed of a series of parallel sub-layers B1 and Bn, having an upwardly decreasing concentration, density and temperature gradients from B1 to Bn.

2. It is assumed in both embodiments that there is at the surface of the pond a convective layer of 0.20 meters, say a layer of complete convection 0.15 meters thick, indicated in FIG. 2 by the vertical upper portion of the temperature graphs A, A', L, L', M and R.

3. The setting of the crystals is effected within a portion of the pond near the heat exchangers and not in settler series S as used in the embodiment of FIG. 1.

4. On FIG. 2 is shown an alternative manner for condensing the power fluid vapours, wherein, a surface layer of the pond of say 0.1 meters thick is utilized as the cooling medium. This could be achieved advantageously by using near the surface a moderately concentrated brine, having a moderate density of say 1.1 to 1.2, but maintaining the required condition of an upwardly decreasing density in the upper stratum U, from the density of layer M to the said moderate density and maintaining the density gradient in stagnant layer SB, from the density of flowing layer FB to the density of flowing layer M as given in the example used in the detailed description of the embodiment of FIG. 2.

5. The components such as the self-lift devices, the Archimedean screw pumps, the containers, the clarifiers shown and described with relation to the embodiment of FIG. 1, are not shown on FIG. 2, but are or could be used also in the embodiment of FIG. 2.

According to the heat balance in table 2b and in FIG. 2, the utilized heat is 2000 kcal/m² day or 31.2%. For the same insolation of 6400 kcal/m² day in summer and for the same convective surface layer of 0.15 meters, a maximum heat utilization of 1280 kcal/m² day or 20% could be obtained according to the known methods.

From columns (l), (m) and (r) on FIG. 2 (the numbers placed in brackets indicate kcal/m² day-see further) of upward heat transmission through the liquid body, it could be seen: (1) that at the left end of the pond i.e. after heat exchange, there is no heat loss to the atmosphere from the flowing bottom layer (FB)' (see column(l). (2) that as the right end of the pond i.e. before heat exchange, the heat loss to the atmosphere from the flowing layer (FB) is the double of the mean heat loss to the atmosphere from layer FB (see columns (r) and (m)).

According to the example given with relation to FIG. 2 embodiment, said difference between the heat losses at the left end and the right end of the pond results in a comparatively high temperature (114° C.) of the flowing bottom layer (FB) at the right end of the pond (see FIG. 2). The so reached temperature enables to obtain a conversion efficiency of 13.5%, assuming a temperature of 110° C. for (FB) directed to heat exchanger HE3 (see further). The embodiment of FIG. 2 is similar in many respects to the apparatus of FIG. 1 (first alternative), therefore generally similar reference numbers or letters are used for the like parts and strata, while other letters are used for said convective flowing bottom layer, and the reference numbers of the parts relating to FIG. 2 embodiment only, are started by the number 200 to be clearly distinguished from the similar parts included in FIG. 1 embodiments. The numbers placed in brackets in FIG. 2 indicate heat in kcal/m² per day due to insulation and heat transmission. The conduits or canals for the brine streams are designated on FIG. 2 by single lines (—·—·—·—). The pumps on these lines are designated by P202, P204 and P206. The valves are designated by V202, V204 and V206 and V206', V206" and V206'". Valves V206 and V206' together with gate 13 are used for start-up operation, as described earlier.

In the embodiment of FIG. 2 the stream (FB) of 116.5 kg/m² (see characteristics of the bottom stratum streams Before Heat Exchange (St-(B) and After Heat Exchange (St-A), in Table 2a) flows through canal or conduit 200 with valve V206 by means of pump P202 into heat exchanger HE3, from the right end wall 10W2 of the pond, flowing out between gates 201' and 203' (for regulating the thickness and the level of the outflowing layer (FB)).

Remark: Between pump P202 and the heat exchanger HE3 is interposed (generally) a salt recovery device of the upwardly diffused salt (not shown on the drawing) or, preferably a salt recovery and self-lift device such as SL1 of FIG. 1 embodiment.

Stream (FB)a (see further) of 116.5 kg/m² at 110° C. (of a heat content of 7130 kcal) flows into heat exchanger HE3 comprising coils or tube bundles 34''' destined for the flow of the power fluid (51 kg of Freon-12) wherein said fluid under a pressure of 28.107 kg/cm² is vaporized.

Remark: Graph R on FIG. 2 shows that the temperature reached by the flowing bottom layer FB at the right end of the pond is 114° C. Nevertheless in this example the temperature used for stream (FB) at the right end of the pond is 110° C.

Due to this relatively high temperature reached, the energy balance of the cycle of 1 kg of the working fluid (F-12) is:
Energy input=$q_1+Q_1$=0.1+39.43=39.53 kcal/kg
Energy output-$q_2+Q_2$=6.42+33.11=39.53 kcal/kg
The available work per cycle of 1 kg (F-12) is calculated as follows:
W=$q_2$×0.85−$q_1$/0.85=6.42×0.85−0.1/0.85=5.34 kcal/kg
The efficiency is:

$$\frac{\text{available work}}{\text{heat input}} = \frac{W}{Q_1} = \frac{5.34}{39.43} = 0.135 \text{ or } 13.5\%$$

compared to the highest efficiency expected of 12% according to the known solar pond methods.

The overall conversion efficiency according to the present invention (embodiment of FIG. 2) is
0.135×0.312=0.042 or 4.2%
compared to
0.12×0.20=0.024 or 2.4%
which is the highest overall efficiency expected according to the known solar pond methods.

By said cooling in HE3 there is obtained the stream (FB)'1 of 116.5 kg/m² at 92° C. (of a heat content of 5950 kcal). Said stream is divided by flow regulating gate 36 into two portions: a first portion (stream (FB)'1') of 31.2 kg/m² (heat content 1595 kcal) flows through heat exchanger HE2 comprising coils or tube bundles 34", destined for the flow of the power fluid 51 kg F-12), wherein said fluid mass in the liquid state, at a pressure of 28.107 kg/cm² is heated from 61° to 90° C. by transmission of 400 kcal to 51 kg of F-12.

The superheated working fluid exiting from coils or tube bundles 34''' at 103° C. and at a pressure of 28.107 kg/cm² is directed through conduit 35 to turbine TU, where it is expanded to a pressure of 7.581 kg/cm². The expanded vapor is directed through conduit 37 and valve V202 to condenser C-PF where it is condensed e.g. by cooling water or by air, absorbing $Q_{2'}$=33.11 kcal/kg or 1690 kcal per 51 kg F-12 approximately.

The condensed power fluid is directed through conduit 37' to pump P1 and is compressed from 7.581 to 28.107 kg/cm², with only a very slight temperature ruse.

Alternatively the expanded vapor is directed from turbine TU through conduit 237 and valve V204 into and through coils or tube bundles 234 comprised in the condenser C-PF(a), where it is condensed, e.g. by using as cooling medium a layer Un at the surface of the pond of say 0.1 meters thick, recycled by pump P206 through conduit 208 from the right end to the left end of the pond and through the condensor C-PF(a). This flowing layer or stream Un could be a brine of moderate density of say 1.1 to 1.2 as mentioned above.

The density of the Dead Sea surface water is 1.175 and the mean surface temperature is 25° C. A solar pond having such a surface density could be used advantageously for condensing the power fluid at a temperature of 30° C.

The heated stream Un outflowing from condenser C-PF(a) at a temperature a little below the condensation temperature of the power fluid, is directed to the right end of the pond, and during its flow through the length of the pond it is cooled to its lowest temperature of say 25° C., by evaporation and other heat losses to the atmosphere.

It is also advantageous to use as cooling medium in condenser C-PF(a) the stream Un of the surface layer having a density of 1.2 to 1.3. In this case the condensation temperature should be raised to say 40° C., corresponding to the condensation pressure of 9.771 kg/cm$^2$. The temperature of stream Un flowing out from C-PF(a) will be say 39°. This higher temperature of Un at the left end of the pond will result in a shift to the right of the upper portion of graph A on the left section of FIG. 2, so that a new temperature graph A' or L' is obtained. This means that less heat will be transmitted upwardly from the bottom stratum B to the upper stratum U at the left end of the pond, resulting in a transmission of more heat from B to U at the right end of the pond and in a shift to the right of the graph R. The temperature at the right end of the bottom of graph R will be higher than 114° C. indicated on this graph.

The negative effect of the rise of the condensation temperature from 30° to 40° C., on the heat conversion efficiency, will be compensated by the positive effect on the heat conversion efficiency of the temperature rise of the hot bottom stream directed to heat exchanger HE3.

The liquid Freon-12 is directed either from condensor C-PF through conduit 37' to pump P1 or from condenser C-PF(a) through conduit 237' to pump P1. In the used main example the liquid is compressed from 7.581 to 28.107 kg/cm$^2$, with only a very slight temperature rise. The compressed liquid is directed through conduit 39 into coils or tube bundles 34' within HE1, wherein it is heated from 30° to 61° C. absorbing 420 keal from 52.4 kg of stream M.

Stream (M)' of 52.4 kg/m$^2$ (heat content=1915 keal) at 64° C., obtained by cooling in HE1 is directed to flow downwardly through passage 42 into a large settling reservoir SR in the form of a rectangle: rectangle with the two parallel walls, wall 10W1' (which is a portion of the left end wall 10W1 of the pond) and wall 212 (the right side wall), and two parallel lateral walls 10L1' (the front side wall) and 10L2' (the rear side wall); both walls are not shown on the drawing and are portions of the lateral walls 10L1 and 10L2 of the pond respectively (both not shown on the drawing). The rectangle is covered with a horizontal partition (or roof) 214, and its bottom of two inclined walls 216 and 218, forming a pit 226 for the dissolution of crystallized salts (see further). The brine within said settling reservoir SR is saturated from bottom to top.

The upper part of SR contains a saturated solution of (M)' at 64° C. (density=1.376) including a small amount of downwardly moving $M_gCl_2H_2O$ crystals (in this example). The formation of the crystals by cooling in HE1 to 64° C. is due to upward diffusion and to some mixing at the interface between stream M at a concentration cM=0.383 corresponding to the saturation temperature of 64° C., and the underlying stagnant layer SB having a higher concentration, resulting in a concentration increase of M above 0.383.

The crystals settle to the bottom while the brine flows upwardly in the direction indicated by the arrows, overflows settler SR and continues to flow in a horizontal stream M.

The lower part of SR contains a saturated solution of stream (FB)"1' at 69° C. (density of 1.382 and concentration of 0.387) including settling $M_gCl_26H_2O$ crystals obtained by cooling said first portion (stream (FB)'1' of 31.2 kg/m$^2$). The crystals settle to the bottom and the brine flows downwardly and then upwardly into and through mixer 234, containing baffles 236 and gate 238, where it mixes with stream (FB) '1" of 85.3 kg/m$^2$ at 92° C., which is the second portion of stream (FB)'1 of 116.5 kg/m$^2$ at 92° C. (heat content=5950 keal) obtained by cooling stream (FB)a in heat exchanger HE3. Said stream (FB)'1" (heat content-4360 keal) flows downwardly through inclined passage 224 and is divided near pit 226 into two parts by flow regulating gate 227: one part flows through passage 224' into mixer 234 and the other part flows into and through pit 226 where it dissolves said settled crystals. The so formed highly concentrated solution flows through gate 227' in a thin layer (fb) over the bottom of the pond, said layer maintaining the concentration and density of the stagnant bottom layer SB' above the concentration of the overlying flowing bottom layer FB. Said one part of stream (FB)'1" at 92° C., flows through passage 224' into mixer 234 and is mixed with said saturated solution at 69° C. The mixture flows upwardly through gate 238 and over gate 201 and then in a horizontal stream overlying SB' and underlying SB. The temperature of said mixture (FB)' is approximately 86° C. and the total mass of stream (FB)' and stream (fb)' is 116.5 kg/m$^2$. The total heat content of these two streams is 5550 keal.

Said stream (FB)' is directed by gates 201 and 203 to flow in a horizontal layer from the left end to the right end of the pond, and is received between gates 201' and 203' by conduit 200 including flow regulating valve V206. The duration of the flow through the pond length is 24 hours in the given examples. During this flow stream (FB)' is heated by insulation from 86° to 114° C., flowing out from the pond as stream (FB). Said stream (fb)' flows to the right end of the pond and is received by conduit 200' including flow regulating valve V206'. During this flow stream (fb)' is heated by insulation to say 114° C. flowing out from the pond as stream (fb).

Said streams flow together through suction conduit 200" of pump P202 and then through discharge conduit 200"' into heat exchanger HE3. This mixture of (FB) and (fb) is designated by (FB)a.

In the given example it is assumed that the temperature of stream (FB)a is 110° C. (heat content=7130 kcal/m$^2$)

Remark: Stream (M)' of 52.4 kg/m$^2$ is heated by insulation during 24 hours of the flow through the length of the pond, from 64° to 78° C., flowing out of the pond at the right end as stream (M) through conduit 240, and is directed by pump P204 through conduit 240' into heat exchanger HE1 where it is cooled from 78° to 64° flowing out as stream (M)' at a heat content of 1915 keal.

Stream (M)' flows from left to right below the horizontal partition 214 and is directed to flow in one of the following ways (the main possibilities) by means of flow regulating gates 44, 228, 230, 232 and 235, and partitions 229 and 233:

(1) The gates are placed in the positions shown on the drawing. In this case stream (M)' flows between the horizontally positioned gates 44 and 228 at a velocity of say 0.01 m/sec.
(2) Gate 44 is inclined a little downwardly to open a passage for a minor portion of say 10% of stream (M)' to flow between the horizontal partition 229 and the horizontally positioned gate 230. In this case the velocity of the major portion of (M)' will be 0.009 m/sec and the velocity of the minor portion will be 0.001 m/sec.

(3) Gate 44 is placed in the horizontal position shown on the drawing and gate 232 is lowered a little to open a passage for a minor portion of say 10% of (M)' to flow between the horizontal partitions 233 and the horizontally positioned gate 235 at a velocity of 0.001 m/sec. The advantage of this flow velocity reduction is explained with reference to an example given earlier with relation to the embodiment of FIG. 1.

By appropriately regulating the gates used for directing stream (M)' to flow in said minor and major portions, the concentration at the bottom of stratum $U$ or at the top of the stagnant bottom layer SB could be corrected if needed. Also, other regulating purposes could be achieved by said regulating gates.

To receive at the opposite side (the right end of the pond), said stream M, there are used in the same manner the following corresponding parts: gates 44', 228', 230', 232', 235' and partitions 229' and 233'.

The required downward flow of stream (FB)"1' to the bottom of mixer 234 through the lower part of SR is achieved by regulating the outflow rate of stream (M)' from SR, by means of two or more of said gates 44, 228, 230, 232 and 235.

Use of Insulation by the Present System

1. Middle section (MS) on FIG. 2.

Line I on FIG. 2 indicates the path of the sunshine reaching the surface of the pond (in summer). Said path I includes arrows pointing to the numbers placed in brackets indicating numbers of kcal/m$^2$.day. The numbers in the left row (i) on the middle section (MS) of FIG. 2 indicate the sunshine received directly by horizontal layers 0.05 meters thick each, excepting the sunshine reflected from the pond surface (say Qr=640 kcal/m$^2$.day), the sunshine penetrating the depth of 0.80 meters (say 2240 kcal/m$^2$.day) and the sunshine received by the convective surface layer of say 0.1 meters thick (say 2144 kcal/m$^2$.day).

The sum of each pair of numbers placed in brackets (the numbers in said middle section) indicate the heat in kcal/m$^2$.day transmitted upwardly from each one of said layers to the adjacent overlying layer, excepting the heat penetrating the depth of 0.80 meters. The row of these sums is designated by (a). The graph of temperature A corresponds to said row (a). The numbers placed in the right side brackets on the middle section (MS), indicate the heat in kcal/m$^2$.day, transmitted upwardly from the flowing bottom stream FB (below 0.80 meters in this example). The row of these numbers is designated by (m). The graph of temperature M corresponds to the total heat transmitted upwardly from layer to layer, i.e., the heat corresponding to the sum of the numbers placed in brackets in the rows (a) and (m).

In row (m) there are two parts, the lower part corresponding to the total heat transmitted (660 kcal/m$^2$.day) from FB (depth of 0.80 meters) up to a depth of 0.45 meters in this example. Above this depth only 240 kcal/m$^2$.day are transmitted upwardly, while the bulk (420 kcal/m$^2$.day) is used to heat layer M as indicated by the horizontal arrow in the path of layer M. The heat (2144)+(1376)+(240)=3760 kcal/m$^2$.day is received by the surface convective layer SCL and is lost to the atmosphere together with the reflected heat (640 kcal/m$^2$.day).

The assumed mean heat losses to the atmosphere are:

| | | |
|---|---|---|
| Reflect heat | Qr = 640 kcal/m$^2$ · day | 10% |
| Heat of evaporation | Qe = 1540 kcal/m$^2$ · day | 24.1% |
| Other heat losses | Qo = 2220 kcal/m · day | 34.7% |
| | 4400 kcal/m$^2$ · day | 68.8% |

The remaining heat of 2000 kcal/m$^2$.day, say 31.2% of the total insulation in summer (6400 kcal/m$^2$.day) is accumulating in the flowing bottom layer FB. This accumulating heat is available for utilization. See the heat balance on FIG. 2 at the bottom of the middle section (MS) and the energy balance in Table 2b.

It will be assumed in the following, for the purpose of simplification, that the temperature of the surface convective layer SCL is 35° C. Based on this assumption the temperature at the bottom of graph A is 71° C., while the temperature at the bottom of graph M is 100° C.

Stream FB at 100° C. flows from the middle to the right end of the pond and its temperature rises from 100° to 114° C. (see further).

2. Left section (LS) on FIG. 2

The numbers placed in brackets in the row (a) on the left section (LS) are equal to the sums of the numbers of row (a) placed in the left side brackets on the middle section (MS), and the graph of temperature A on (LS) is the same as the graph of temperature A on (MS).

The numbers placed in the right side brackets of the left section (LS) indicate the heat in kcal/m$^2$.day, transmitted upwardly from the flowing bottom stream (FB)' (below 0.80 meters in this example). The row of these numbers is designated by (1). The graph of temperature L corresponds to the total heat transmitted upwardly from layer to layer, i.e., to the sum of each pair of the numbers placed in brackets in the rows (a) and (1).

In row (1) the heat transmitted (450 kcal/m$^2$.day) from (FB)' (depth 0.80 meters) up to a depth of 0.45 meters, is used to heat layer (M)' as indicated by the horizontal arrow in the path of (M)'. The heat (2144)+(1376)=3520 kcal/m$^2$.day is received by the surface convective layer SCL and is lost to the atmosphere together with the reflected heat (640 kcal/m$^2$.day).

This means that on the left section (LS) there are not heat losses to the atmosphere from the flowing bottom layer (FB)'. From the heat balance on FIG. 2 at the bottom of the left section, it could be seen that the accumulating heat in the left section (LS) is 2240 kcal/m$^2$.day. From this heat 2000 kcal/m$^2$.day are reserved for utilization and the excess of 240 kcal/m$^2$.day are reserved for increasing the available heat at the right end of the pond (see further).

The temperature at the bottom of graph 2 is 86° C. This temperature is increased gradually from the left end of the pond to 100° C. at the middle section of the pond and then to 114° C. at the right end of the pond.

Remark: It is advantageous to use for the above-mentioned middle level stream M a smaller mass than said 52.4 kg/m$^2$ directed to heat exchanger HE1 in the given example. The preferred mass to be used is such that after being cooled by the liquid power fluid in HE1, the saturation temperature reached will correspond to the minimum density required for producing and maintaining a satisfactory upwardly decreasing density gradient in the upper stratum U overlying said stream M. The use of said minimum mass for stream M will reduce to a minimum the upward heat transmission from stream (M)' to stratum U at the left section of the pond and will increase the final temperature of stream (M) and the top temperature of stream (FB) to be used in heat exchanger HE3, achieving in this manner a higher heat conversion efficiency than with any greater mass used.

3. Right section (RS) on FIG. 3

The numbers placed in brackets in the row (a) on the right section (RS) are equal to the sums of the numbers of row (a) placed in the left side brackets on the middle section (MS), and the graph of temperature A on (RS) is the same as the graph of temperature A on (MS).

The graph of temperatures R corresponds to the heat transmitted upwardly from layer to layer, i.e., to the sums of each pair of the numbers placed in brackets in the rows (a) and (r).

In row (r) there are two parts, the lower part corresponding to the total heat transmitted (870 kcal/m$^2$.day) from (FB) (depth of 0.80 meters) up to a depth of 0.45 meters in this example. Above this depth only 480 kcal/m$^2$.day are transmitted upwardly, while 390 kcal/m$^2$day, are accumulating in stream M as indicated by the horizontal arrow in the path of (M). The heat (2144)+(1376)+(480)=4000 kcal/m$^2$.day is received by the surface convective layer SCL and is lost to the atmosphere together with the reflected heat (640 kcal/m$^2$.day).

The mean of the sum of the heat lost to the atmosphere from the left end of the pond and the right end of the pond is:

Left end          Right end $$\frac{(3520 + 640) + (4000 + 640)}{2} = 4400 \text{ kcal/m}^2 \cdot \text{day.}$$

This is the mean heat loss from the pond to the atmosphere, which is equal to the heat loss shown on the middle section of FIG. 2.

TABLE 2a

Characteristics of the Hot Streams

| | m | d | c | t | Hc |
|---|---|---|---|---|---|
| St-(B) | | | | | |
| (M) | 52.4 | 1.371 | 0.383 | 78 | 2335 |
| (FB)a | 116.5 | 1.384 | 0.398 | 110 | 7130 |
| Total | 168.9 | | | | 9465 |
| St-(A) | | | | | |
| (M)' | 52.4 | 1.376 | 0.383 | 64 | 1915 |
| (FB)'a | 116.5 | 1.392 | 0.398 | 86 | 5550 |
| Total | 168.9 | | | | 7465 |

TABLE 2b

Energy Balance

| Term | Energy in kcal/m$^2$ · day |
|---|---|
| Solar heat reaching FB at a depth of 0.80 meters | (+) 2240 |
| Heat loss upwardly from FB | (−) 660 |
| Heat trapped in FB | (+) 1580 |
| Heat trapped in M | (+) 420 |
| Available heat for utilization | + 2000 |
| Heat utilized in HE3 | (−) 1180 |
| Heat utilized in HE2 | (−) 400 |
| Heat utilized in HE1 | (−) 420 |
| | 0.000 |

It is understood that the values set forth above are based on preliminary calculations given merely to illustrate the principles of the invention, and are not necessarily exact nor required to utilize successfully the various features of the invention described. It is to be further understood that the embodiments described are purely for purposes of example, and that many other variations, modifications and applications of the invention, or the several features thereof disclosed, may be made.

WHAT IS CLAIMED IS:

1. A method of establishing and operating a solar pond of an aqueous solution having a downwardly-increasing density, concentration and temperature gradient, characterized in:
   A. forming the pond with at least three vertically spaced, horizontal strata of predetermined masses and concentrations, comprising:
      (1) an upper stratum including a lower stagnant layer having a downwardly-increasing density gradient;
      (2) a middle stratum including at least one horizontally-flowing layer; and
      (3) a bottom stratum including at least one horizontally-flowing layer; and
   B. and extracting heat from said horizontally-flowing layers of the bottom and middle strata by withdrawing solution from each of said layers from one end of the pond, circulating said withdrawn solutions through heat-exchangers to cool same, re-establishing from the cooled solution the predetermined masses and concentrations of the respective withdrawn solution, and directing same to their respective levels at the other end of the pond, sufficient heat being extracted from the withdrawn solution of the middle stratum to cool same to a predetermined saturation temperature; the solute excess resulting from the mixing between at least a part of the middle stratum and parts of the more concentrated stratum being crystallized by said cooling, settling to the bottom of the pond, and being redissolved in the bottom stratum.

2. The method according to claim 1, wherein said bottom stratum if formed with a plurality of thin, adjacent, superimposed, horizontally-flowing layers of downwardly-increasing density, concentration and temperature.

3. The method according to claim 1, wherein said middle stratum is formed with a plurality of thin, adjacent, superimposed, horizontally-flowing layers of downwardly-increasing density, concentration and temperature, each of said thin layers being formed by mixing predetermined fractions of a part of the middle stratum solution, cooled to a predetermined saturation temperature, with predetermined fractions of a part of the bottom stratum solution cooled to a predetermined temperature.

4. The method according to claim 1, wherein said bottom stratum is formed with a stagnant layer between its horizontally-flowing layer and said middle stratum.

5. The method according to claim 1, wherein a downwardly-increasing concentration, density and temperature gradient is established and maintained in the bottom stratum by cooling a predetermined first part of one portion of the horizontally-flowing layers of the bottom stratum solution at the outflowing end of the pond to below its saturation temperature, in a first heat exchanger, thus causing the crystallization of a part of the dissolved solute, the produced crystals settling at the bottom of the pond and being redissolved in the second portion withdrawn from the flowing bottom stratum solution, thus increasing its concentration; the second part of said one portion being cooled in a second heat exchanger to above its saturation temperature, to produce the following three solutions of decreasing concentration, density, and temperature:

(a) the cooled first part of said one portion, after separation of the crystallized solute;

(b) the cooled second part of said one portion; and (c) said second portion after dissolving said settling crystals; the above three solutions being directed to the pond at its inflowing end to form three corresponding horizontally adjacent superimposed sub-layers of downwardly increasing concentration, density, and temperature, thus establishing and maintaining said gradient in the flowing layer of the bottom stratum; the heat extracted from said first part and from said second part of said one portion of the solution withdrawn from the flowing layer of the bottom stratum by said heat exchangers being available for heating and power production.

6. The method according to claim 1 wherein at least one horizontally-flowing layer of the bottom stratum is adjacent to the middle stratum with no stagnant layer in between.

7. The method according to claim 1, wherein the slope characterizing the density gradient set up and maintained in the bottom and middle strata is steeper than the slope characterizing the density gradient set up and maintained in the stagnant layer of the upper stratum.

8. A method of trapping and subsequently utilizing solar energy, comprising the steps of: providing a body of a highly concentrated, not saturated, aqueous solution in a solar pond, said solution being divided horizontally into a bottom stratum B, a top stratum U, and a flowing middle level layer M interposed between said strata; the top stratum U being divided horizontally into a convective surface layer overlying a stagnant layer, which is adjacent and overlying said middle level layer M; the bottom stratum B being divided horizontally into at least two layers: a stagnant bottom layer SB underlying said layer M, and a flowing bottom layer FB between said layer SB and the bottom of the pond; said layers of the top stratum U the middle level layer M and the layers of the bottom stratum B forming a series of superimposed adjacent horizontal layers; the density concentration and temperature at the interfaces between adjacent layers of said series, decreasing upwardly from said flowing bottom layer to said convective surface layer;

setting up and maintaining upwardly decreasing density, concentration and temperature gradients in said stagnant layer of the top stratum U and in said stagnant layer of the bottom stratum B;

withdrawing the following hot solutions from one end of the pond, cooling said withdrawn solutions in respective heat exchangers and reinjecting the cooled solutions at the other end of the pond into the respective levels of said flowing solutions; and utilizing by means of said heat exchangers the solar heat trapped by said flowing layers for power production and heating operations;

the concentration of the flowing middle level layer M being maintained by: withdrawing hot solution at the outflowing end of the pond at the level of said layer M, cooling said withdrawn solution in a heat exchanger HE1 to the saturation temperature corresponding to the concentration chosen for said middle level layer M, and reinjecting the cooled solution into the inflowing end of the pond at the level of layer M; any solute excess in the solution injected into heat exchanger HE1 being crystallized by said cooling, settling and being redissolved in the bottom stratum B; a small fraction of the bottom flowing solution being eventually injected into HE1 to increase the concentration of the solution flowing therethrough to above said chosen concentration; the solar heat trapped by said layer M being utilized in a power production system and for heating operation.

9. A method according to claim 8, wherein the slope characterizing the density gradient set up in the stagnant bottom layer is steeper than the slope characterizing the density gradient set up in the top stratum.

10. A method according to claim 8, wherein said bottom stratum B is composed of at least four superimposed horizontal layers: including said stagnant bottom layer SB underlying the adjacent flowing middle level layer M, said flowing bottom layer FB underlying adjacent layer SB, a stangnant layer SB' functioning as a large heat storage container underlying adjacent flowing layer FB, and a flowing thin layer fb overlying the bottom of the pond.

11. A method according to claim 10, wherein there are established upwardly decreasing concentration, density and temperature gradients in the flowing bottom layer FB in the form of a series of superimposed adjacent horizontally flowing sub-layers of upwardly decreasing concentration, density and temperature, from the bottom level sub-layer overlying stagnant layer SB' to the top level sub-layer of said series, underlying said stagnant layer SB, by directing one portion Bml of said layer FB to a heat exchanger HE3 where said one portion is cooled to near its saturation temperature, then the nearly saturated one portion is divided into two parts: a first part B'ml' is directed to another heat exchanger HE2 where it is cooled to below its saturation temperature, thus causing the crystallization of a part of the dissolved solute, the produced crystals settling to the bottom of a settling device are dissolved by the other portion Bm2 of said layer FB, the so obtained highly concentrated solution is directed to flow in a layer B'1 adjacent and overlying the bottom of the pond, eventually adjacent and overlying said stagnant layer SB', the so cooled saturated liquid obtained after separation of said crystals is directed to flow in a layer B'3 adjacent and underlying said stagnant bottom layer SB, while the second part B'ml" flowing out from heat exchanger HE3 is directed to flow in a horizontal layer B'2 between said flowing layers B'1 and B'3, and by directing portions of B'1 and B'1, and portions of B'2 and B'3 of these adjacent layers to flow through mixing devices and then by further mixing of portions of the so obtained mixtures there is produced said series of superimposed adjacent horizontally flowing sub-layers of upwardly decreasing density, concentration and temperature.

12. A method as claimed in claim 10, wherein said top level sub-layer of said series of flowing sub-layers of said layer FB is adjacent and underlying said middle level layer M, and said bottom level sublayer of said series of flowing sub-layers of said layer FB is adjacent and overlying stagnant layer SB', said series of flowing sub-layers of upwardly decreasing density, concentration and temperature fulfilling the functions of flowing layer FB and of stagnant layer SB.

13. A method as claimed in claim 10, wherein there is comprised a step relating to a minor portion of any one of the flowing layers M or FB, this minor portion forming a very slowly flowing layer interposed between the overlying and eventually underlying stagnant layer of the liquid body and the underlying and eventually overlying major portion of any one of said flowing layers, said minor portions flowing at an order of magnitude slower than said major portions, act as a buffer to the mixing of the flowing liquid body into the overlying and eventually underlying stagnant liquid body, respectively.

14. A method as claimed in claim 10, wherein there are maintained, controlled and eventually corrected in the pond solution upwardly decreasing concentration, temperature and density gradients by the following steps:
   (1) The water evaporated from the surface of the pond is returned to the pond surface as make-up water;
   (2) The upwardly diffused solute is returned to the bottom of the pond by directing a mass (m)Un from the surface of the pond to the flowing bottom layer, said mass (m)Un containing the mass (m)D of the defused solute, and evaporating from the flowing bottom layer the mass (m)W of water contained in said mass (m)Un of the surface solution;
   (3) Stream M and a minor portion of a mixture (FB)a of streams FB and fb are cooled in heat exchangers HE1 and HE2 respectively to chosen saturation temperatures, the crystallized solute settling to the bottom of the pond being redissolved by a fraction of the major portion of said mixture (FB)a after being cooled in heat exchanger HE3 to at least a few degrees above its saturation temperature, thus producing stream fb flowing in a thin layer overlying and adjacent to the bottom of the pond, said layer fb being the most concentrated solution of the pond.

15. A method as claimed in claim 10, wherein: said middle level layer M is formed of a series of superimposed adjacent sub-layer (S)M of upwardly decreasing concentration, temperature and density from the bottom sub-layer of the series adjacent and overlying stratum B to the top sub-layer of said series adjacent and underlying stratum U; said sub-layers are directed from the outflowing end of the pond at upwardly decreasing concentrations to respective sub-heat exchangers (S)HE1; and the cooled sub-layers outflowing from said sub-heat exchangers at decreasing concentrations, temperature and densities, are injected into the inflowing end of the pond at the levels of the respective said outflowing sub-layers to re-form said series of superimposed adjacent sub-layers (S)M.

* * * * *